(12) United States Patent
Ly et al.

(10) Patent No.: US 11,387,927 B2
(45) Date of Patent: *Jul. 12, 2022

(54) TECHNIQUES AND APPARATUSES FOR TERTIARY SYNCHRONIZATION SIGNAL DESIGN FOR NEW RADIO

(71) Applicant: QUALCOMM Incorporated, San Diego, CA (US)

(72) Inventors: Hung Ly, San Diego, CA (US); Haitong Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,184

(22) Filed: Nov. 11, 2019

(65) Prior Publication Data

US 2020/0083975 A1 Mar. 12, 2020

Related U.S. Application Data

(66) Continuation of application No. 15/943,011, filed on Apr. 2, 2018, now Pat. No. 10,476,623, Substitute for application No. 62/480,837, filed on Apr. 3, 2017.

(51) Int. Cl.
*H04J 11/00* (2006.01)
*H04J 1/14* (2006.01)
(Continued)

(52) U.S. Cl.
CPC ............ *H04J 11/0079* (2013.01); *H04J 1/06* (2013.01); *H04J 1/14* (2013.01); *H04J 11/0073* (2013.01);
(Continued)

(58) Field of Classification Search
CPC .. H04J 11/0079; H04J 1/14; H04J 1/06; H04J 2203/0069; H04L 27/2692; H04L 27/2613;
(Continued)

(56) References Cited

U.S. PATENT DOCUMENTS 8,831,119 B2 9/2014 Kang et al.
9,521,554 B2 12/2016 Farajidana et al.
(Continued)

FOREIGN PATENT DOCUMENTS

CN 104620516 A 5/2015
CN 104641582 A 5/2015
(Continued)

OTHER PUBLICATIONS

Wang, Shuang, Xin Zhang, and Dacheng Yang. "A joint sequence design for multi-beam detection in millimeter wave cellular systems." 2017 3rd IEEE International Conference on Computerand Communications (ICCC). IEEE, 2017. (Year: 2017).*
(Continued)

*Primary Examiner* — Sharad Rampuria
(74) *Attorney, Agent, or Firm* — Harrity & Harrity, LLP

(57) ABSTRACT

Certain aspects of the present disclosure generally relate to wireless communication. In some aspects, a base station may identify a synchronization signal (SS) block index associated with a SS block; scramble a physical broadcast channel (PBCH), associated with the SS block, based at least in part on the SS block index; and transmit the SS block including a tertiary synchronization signal (TSS) and the PBCH, wherein the TSS includes information that identifies the SS block index associated with the SS block, and wherein the TSS is frequency division multiplexed with the PBCH in two or more orthogonal frequency-division multiplexed (OFDM) symbols of the SS block. Numerous other aspects are provided.

24 Claims, 18 Drawing Sheets

(51) Int. Cl.
*H04J 1/06* (2006.01)
*H04L 5/00* (2006.01)
*H04L 27/26* (2006.01)
*H04W 56/00* (2009.01)
*H04W 72/04* (2009.01)

(52) U.S. Cl.
CPC .......... *H04J 11/0076* (2013.01); *H04L 5/005* (2013.01); *H04L 5/0053* (2013.01); *H04L 27/2613* (2013.01); *H04L 27/2692* (2013.01); *H04W 56/00* (2013.01); *H04L 5/0051* (2013.01); *H04W 72/042* (2013.01)

(58) Field of Classification Search
CPC ..... H04L 5/005; H04L 5/0053; H04L 5/0051; H04W 72/042; H04W 72/04; H04W 72/12; H04W 76/00; H04B 7/2121; H04B 7/2123; H04Q 2213/394
See application file for complete search history.

(56) References Cited

U.S. PATENT DOCUMENTS

| | | |
|---|---|---|
| 10,194,410 B2 | 1/2019 | Ly et al. |
| 10,470,191 B2 | 11/2019 | Si et al. |
| 10,476,623 B2 | 11/2019 | Ly et al. |
| 10,903,957 B2 | 1/2021 | Ko et al. |
| 2011/0076960 A1 | 3/2011 | Yun et al. |
| 2014/0247808 A1 | 9/2014 | Zhang et al. |
| 2014/0321306 A1 | 10/2014 | Nam et al. |
| 2015/0296486 A1 | 10/2015 | Park et al. |
| 2015/0304932 A1 | 10/2015 | Wei et al. |
| 2016/0277225 A1 | 9/2016 | Frenne et al. |
| 2016/0294528 A1 | 10/2016 | Kim et al. |
| 2016/0337105 A1 | 11/2016 | Lawton et al. |
| 2017/0041894 A1 | 2/2017 | Lee et al. |
| 2017/0064685 A1 | 3/2017 | Rico Alvarino et al. |
| 2018/0084593 A1 | 3/2018 | Chen et al. |
| 2018/0302870 A1 | 10/2018 | Abedini et al. |
| 2018/0324732 A1 | 11/2018 | Park et al. |
| 2018/0324753 A1 | 11/2018 | Islam et al. |
| 2018/0343595 A1* | 11/2018 | da Silva ............... H04B 7/0695 |

FOREIGN PATENT DOCUMENTS

| | | |
|---|---|---|
| CN | 105164965 A | 12/2015 |
| CN | 105637964 A | 6/2016 |
| CN | 106537964 A | 3/2017 |
| EP | 2665221 A2 | 11/2013 |
| JP | 2015505657 A | 2/2015 |
| JP | 2020508614 A | 3/2020 |
| WO | WO-2010019907 A1 | 2/2010 |
| WO | WO-2015080649 A1 | 6/2015 |
| WO | 2017201509 A1 | 11/2017 |
| WO | 2018017840 A1 | 1/2018 |
| WO | WO-2018155987 A2 | 8/2018 |

OTHER PUBLICATIONS

Cisco et al., "Verizon 5G TF; Air Interface Working Group; Verizon 5th Generation Radio Access; Physical channels and modulation (Release 1)", TS V5G.211 V1.7, Oct. 2016, http://www.5gtf.net/V5G_211_v1p7.pdf, 83 pages.
Ericsson et al., "KT PyeongChang 5G Special Interest Group (KT 5G-SIG); KT 5th Generation Radio Access; Physical Layer; Physical channels and modulation (Release 1)", TS 5G.211, V2.6, Sep. 2016, https://corp.kt.com/data/kthome/business/kt5g/5G_211_v2.6.pdf, pp. 1-66.
Ericsson: "SS Burst Set Composition", R1-1706008, 3GPP TSG-RAN WG1 Meeting #88bis, Spokane, U.S., Apr. 3-7, 2017, 6 Pages.
Huawei et al., "Discussion on SS Burst Set Composition and SS Block Time Index Indication", 3GPP Draft; R1-1703353, 3rd Generation Partnership Project (3GPP), Mobile Competence Centre; 650, Route Des Lucioles; F-06921 Sophia-Antipolis Cedex; France vol. RAN WG1 Meeting #88, Athens, Greece, Feb. 13, 2017-Feb. 17, 2017 Feb. 12, 2017 (Feb. 12, 2017), XP051210483, pp. 1-7, Retrieved from the Internet: URL:http://www.3gpp.org/ftp/Meetings_3GPP SYNC/RAN1/Docs/ [retrieved on Feb. 12, 2017].
International Search Report and Written Opinion—PCT/US2018/025844—ISA/EPO—dated Jun. 19, 2018.
ITL: "On NR-SS Structure and Time Indexing", R1-1703422, 3GPP TSG RAN WG1 Meeting #88, Athens, Greece Feb. 13-17, 2017, 6 Pages.
Nokia et al., "SS Bandwidth, Numerology and Multiplexing", 3GPP Draft; R1-1701056, 3rd Generation Partnership Project (3GPP), Mobile Competence Centre; 650, Route Des Lucioles; F-06921 Sophia-Antipolis Cedex, France vol. RAN WG1, no. Spokane, U.S.A., Jan. 16, 2017-Jan. 20, 2017, Jan. 16, 2017 (Jan. 16, 2017), XP051208571, pp. 8, Retrieved from the Internet: URL:http://www.3gpp.org/ftp/Meetings_3GPP_SYNC/RAN1/Docs/.
"NR-PBCH Design," 3GPP Draft; R1-1705321, 3rd Generation Partnership Project (3GPP), Mobile Competence Centre; 650 Route Des Lucioles; F-06921 Sophia-Antipolis Cedex; France, vol. RAN WG1, Spokane, USA; Apr. 3, 2017-Apr. 7, 2017, Apr. 2, 2017, (Apr. 2, 2017), XP051243451, 8 pages, Retrieved from the Internet: URL:http://www.3gpp.org/ftp/Meetings_3GPP_SYNC/RAN1/Docs/ [retrieved on Apr. 2, 2017].
Qualcomm Incorporated: "PBCH Design Considerations," 3GPP Draft; R1-1705568, PBCH Design Consideration, 3rd Generation Partnership Project (3GPP), Mobile Competence Centre; 650, Route Des Lucioles; F-06921, Sophia-Antipolis Cedex; France, vol. RAN WG1, Spokane, USA; Apr. 3, 2017-Apr. 7, 2017, Apr. 2, 2017 (Apr. 2, 2017), XP051243696, Retrieved from the Internet: URL: http://www.3gpp.org/ftp/Meetings_3GPP_SYNC/RAN1/Docs/ [retrieved on Apr. 2, 2017].
Samsung: "SS Block Composition, SS Burst Set Composition and SS Time Index Indication", 3GPP Draft; R1-1705318, 3rd Generation Partnership Project (3GPP), Mobile Competence Centre, 650, Route Des Lucioles, F-06921, Sophia-Antipolis Cedex, France, vol. RAN WG1, no. Spokane. USA; Apr. 3, 2017-Apr. 7, 2017, Apr. 2, 2017 (Apr. 2, 2017), XP051243448, 12 pages, Retrieved from the Internet: URL: http://www.3gpp.org/ftp/Meetings_3GPP Sync/RAN1/Docs/ [retrieved on Apr. 2, 2017].
Sequans Communications: "Discussion on SS Time Index Indication," 3GPP Draft; R1-1704599, 3rd Generation Jartnership Project (3GPP), Mobile Competence Centre; 650 Route Des Lucioles; F-06921, Sophia-Antipolis Cedex; France, vol. RAN WG1, no. Spokane, USA; Apr. 3, 2017-Apr. 7, 2017, Apr. 2, 2017, (Apr. 2, 2017), XP051242738, 10 pages, Retrieved from the Internet: URL: http://www.3gpp.org/ftp/Meetings_3GPP_SYNC/RAN1/Docs/ [retrieved on Apr. 2, 2017].
ZTE et al., "Considerations on SS Block Design", 3GPP Draft R1-1611268, 3rd Generation Partnership Project (3GPP), Mobile Competence ; 650, Route Des Lucioles; F-06921 Sophia-Antipolis Cedex; France, vol. RAN WG1 Meeting #87, No. Reno, USA; Nov. 13, 2016, XP051175249, 7 pages, Retrieved from the Internet:URL:http://www.3gpp.org/ftp/Meetings_3GPP_SYNC/RAN1/Docs/ [retrieved on Nov. 13, 2016].
Huawei., et al., "WF on SS Burst Set Composition and SS—Block Index Indication", 3GPP TSG RAN WG1 Meeting #88, Draft; R1-1703832 Wf on SS Burst Set Composition and SS-Block Index Indication_V4, 3rd Generation Partnership Project (3GPP), Mobile Competence Centre, 650, Route Des Lucioles, F-06921 Sophia-Antipolis, vol. RAN WG1. No. Athens, Greece; Jan. 13, 2017-Jan. 17, 2017, Feb. 16, 2017 (Feb. 16, 2017), XP051236632, 7 Pages, Retrieved from the Internet: URL: http://www.3gpp.org/ftp/tsg_ran/WG1_RL1/TSGR1_88/Docs/[retrieved on 2017-02-16], [retrieved on Feb. 16, 2017].
Intel Corporation :"Considerations for Synchronization Signal Sequence", 3GPP TSG RAN WG1 AH_NR Meeting, R1-1700330, Spokane, USA, Jan. 16-20, 2017, XP051207867, pp. 1-6.
Spreadtrum Communications: "Indication of the SS-Block Index in Multi-Beam Cases", 3GPP Draft, R1-1700288, Indication of the SS-Block Index In Multi-Beam Cases—Final, 3rd Generation Partnership Project (3GPP), Mobile Competence Centre, 650, Route

(56) References Cited

OTHER PUBLICATIONS

Des Lucioles, F-06921, Sophiaanti, vol. RAN WG1, No. Spokane, USA, Jan. 16, 2017-Jan. 20, 2017 Jan. 16, 2017 (Jan. 16, 2017), XP051207826, Retrieved from the Internet:URL:http://www.3gpp.org/ftp/Meetings_3GPP SYNC/RAN1/Docs/ [retrieved on Jan. 16, 2017], 4 pages.

Taiwan Search Report—TW107111807—TIPO—dated Jun. 25, 2021.

Chavva A.K.R., et al., "LTE Rel-13 MTC Device Receiver Algorithms for Coverage Enhancement", 2016 IEEE Wireless Communications and Networking Conference (WCNC), Apr. 6, 2016, 7 Pages.

Tao W., "Research on Anti-Jamming Performance of LTE Signals", Modern Science and Technology of Telecommunications, No. 9, Sep. 25, 2014, 7 Pages.

Intel Corporation: "Synchronization Signal Sequence Design" [online], 3GPP Draft, 3GPP TSG RAN WG1 Meeting RAN1 #88, R1-1702180, Athens, Greece Feb. 13-17, 2017, 9 Pages, Retrieved from the Internet: URL: http://www.3gpp.org/ftp/tsg_ran/WG1_RL1/TSGR1_88/Docs/R1-1702180.zip.

Interdigital Communications: "On Broadcast Channel Transmission", 3GPP TSG RAN WG1 Meeting #88, R1-1702318, Athens, Greece, Feb. 13, 2017-Feb. 17, 2017, 8 Pages, Feb. 7, 2017, Internet URL: http://www.3gpp.org/ftp/tsg_ran/WG1_RL1/TSGR1_88/Docs/R1-1702318.zip.

Motorola Mobility: "Introduction of Rel-12 LTE-Advanced Features in 36.213", 3GPP TSG-RAN WG1 Meeting #77, R1 -142501, Seoul, Korea, May 19-23, 2014, pp. 1-208, May 16, 2014.

Ericsson: "System Information Delivery in NR", 3GPP TSG-RAN WG1 Meeting #87, R1-1611901, Reno, Nevada, USA, Nov. 14 -18, 2016, 5 Pages, Nov. 13, 2016, XP051175868.

\* cited by examiner

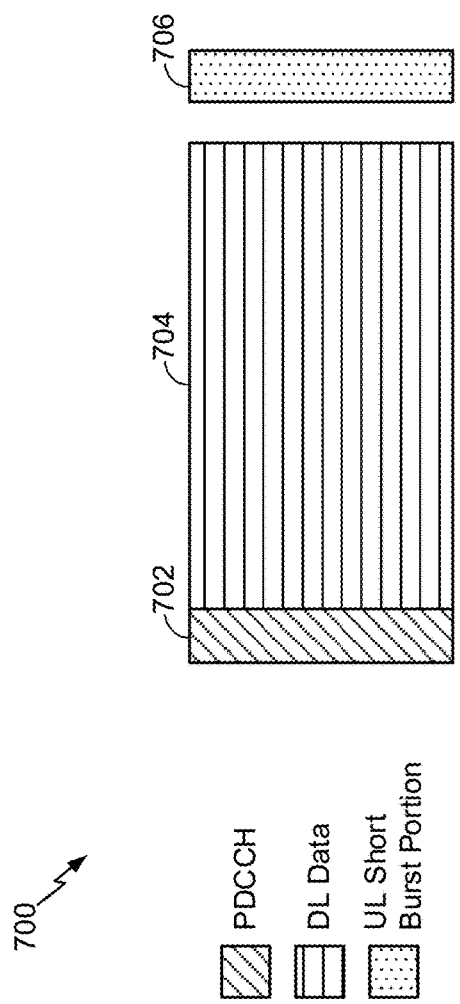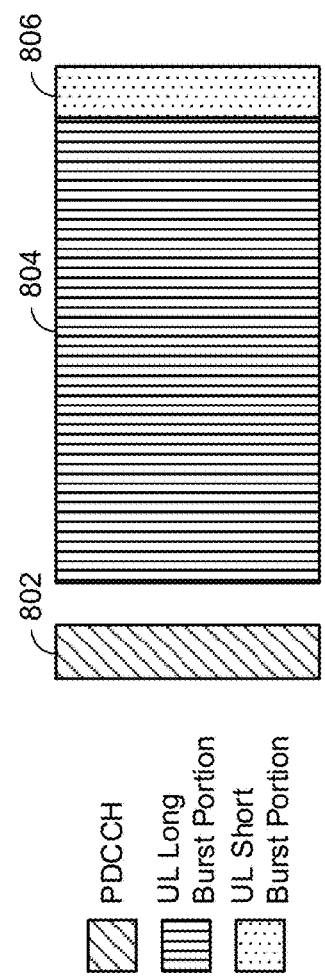

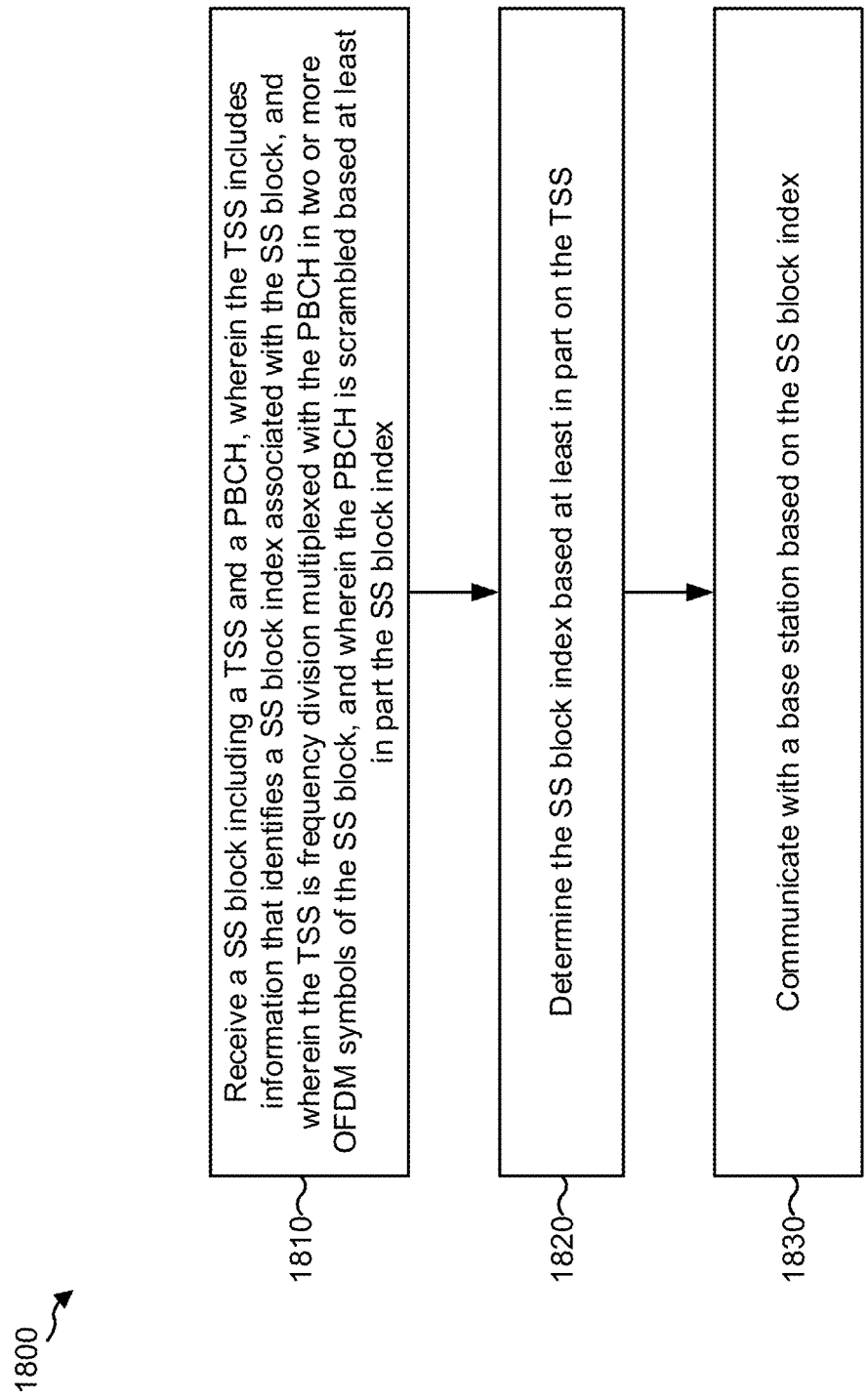

TECHNIQUES AND APPARATUSES FOR TERTIARY SYNCHRONIZATION SIGNAL DESIGN FOR NEW RADIO

CROSS REFERENCE TO RELATED APPLICATIONS

This application is a continuation of U.S. Non-provisional patent application Ser. No. 15/943,011, filed Apr. 2, 2018 (now U.S. Pat. No. 10,476,623) entitled "TECHNIQUES AND APPARATUSES FOR TERTIARY SYNCHRONIZATION SIGNAL DESIGN FOR NEW RADIO," which claims priority to U.S. Provisional Patent Application No. 62/480,837 filed on Apr. 3, 2017 entitled "TECHNIQUES AND APPARATUSES FOR TERTIARY SYNCHRONIZATION SIGNAL DESIGN FOR NEW RADIO," which are incorporated by reference herein.

FIELD OF THE DISCLOSURE

Aspects of the present disclosure generally relate to wireless communication, and more particularly to techniques and apparatuses for tertiary synchronization signal (TSS) design for new radio (NR).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a base station may include identifying a synchronization signal (SS) block index associated with a SS block; determining a tertiary synchronization signal (TSS) based at least in part on the SS block index; and transmitting the SS block including: a first orthogonal frequency-division multiplexed (OFDM) symbol including a first portion of the TSS and a first portion of a physical broadcast channel (PBCH), wherein the first portion of the TSS and the first portion of the PBCH may be frequency division multiplexed in the first OFDM symbol, a second OFDM symbol including a secondary synchronization signal (SSS), a third OFDM symbol including a second portion of the TSS and a second portion of the PBCH, wherein the second portion of the TSS and the second portion of the PBCH may be frequency division multiplexed in the third OFDM symbol, and a fourth OFDM symbol including a primary synchronization signal (PSS).

In some aspects, a method for wireless communication performed by a base station may include identifying a SS block index associated with a SS block; determining a TSS based at least in part on the SS block index, wherein the TSS may include a set of bits that correspond to the SS block index associated with the SS block; and transmitting the SS block including the TSS, wherein the TSS may be frequency division multiplexed with a PBCH in two or more OFDM symbols of the SS block.

In some aspects, a method for wireless communication performed by a base station may include identifying a SS block index associated with a SS block; determining a TSS based at least in part on the SS block index, wherein the TSS may include a sequence that corresponds to the SS block index associated with the SS block; and transmitting a SS block including the TSS, wherein the TSS is frequency division multiplexed with a PBCH in two or more OFDM symbols of the SS block.

In some aspects, a method for wireless communication performed by a base station may include identifying a SS block index associated with a SS block; scrambling a PBCH, associated with the SS block, based at least in part on the SS block index; and transmitting the SS block including a TSS and the PBCH, wherein the TSS may include information that identifies the SS block index associated with the SS block, and wherein the TSS may be frequency division multiplexed with the PBCH in two or more OFDM symbols of the SS block.

In some aspects, a wireless communication device for wireless communication may include memory and one or more processor operatively coupled to the memory, the memory and the one or more processors may be configured to identify a SS block index associated with a SS block; scramble a PBCH, associated with the SS block, based at least in part on the SS block index; and transmit the SS block including a TSS and the PBCH, wherein the TSS may include information that identifies the SS block index associated with the SS block, and wherein the TSS may be frequency division multiplexed with the PBCH in two or more OFDM symbols of the SS block.

In some aspects, a non-transitory computer-readable medium may store one or more instructions for wireless communication. The one or more instructions, when executed by one or more processors of a wireless communication device, may cause the one or more processors to identify a SS block index associated with a SS block; scramble a PBCH, associated with the SS block, based at least in part on the SS block index; and transmit the SS block including a TSS and the PBCH, wherein the TSS may include information that identifies the SS block index associated with the SS block, and wherein the TSS may be frequency division multiplexed with the PBCH in two or more OFDM symbols of the SS block.

In some aspects, an apparatus for wireless communication may include means for identifying a SS block index associated with a SS block; means for scrambling a PBCH, associated with the SS block, based at least in part on the SS block index; and means for transmitting the SS block including a TSS and the PBCH, wherein the TSS may include information that identifies the SS block index associated with the SS block, and wherein the TSS may be frequency division multiplexed with the PBCH in two or more OFDM symbols of the SS block.

In some aspects, a method for wireless communication performed by a user equipment may include receiving a SS block including: a first OFDM symbol including a first portion of a TSS and a first portion of a PBCH, wherein the first portion of the TSS and the first portion of the PBCH may be frequency division multiplexed in the first OFDM symbol, a second OFDM symbol including a SSS, a third OFDM symbol including a second portion of the TSS and a second portion of the PBCH, wherein the second portion of the TSS and the second portion of the PBCH may be frequency division multiplexed in the third OFDM symbol, and a fourth OFDM symbol including a PSS; determining the TSS based at least in part on the SS block; and identifying a SS block index, associated with the SS block, based at least in part on the TSS.

In some aspects, a method for wireless communication performed by a user equipment may include receiving a SS block including a TSS, wherein the TSS may include a set of bits associated with determining a SS block index associated with the SS block, wherein the TSS may be frequency division multiplexed with a PBCH in two or more OFDM symbols of the SS block; determining the TSS, including the set of bits, based at least in part on the SS block; and identifying the SS block index, associated with the SS block, based at least in part on the set of bits.

In some aspects, a method for wireless communication performed by a user equipment may include receiving a SS block including a TSS, wherein the TSS may include a sequence that identifies a SS block index associated with the SS block, and wherein the TSS may be frequency division multiplexed with a PBCH in two or more OFDM symbols of the SS block; determining the TSS, including the sequence, based at least in part on the SS block; and identifying the SS block index, associated with the SS block, based at least in part on the sequence.

In some aspects, a method for wireless communication performed by a user equipment may include receiving a SS block including a TSS and a PBCH, wherein the TSS may include information that identifies a SS block index associated with the SS block, and wherein the TSS may be frequency division multiplexed with the PBCH in two or more OFDM symbols of the SS block, and wherein the PBCH may be scrambled based at least in part the SS block index; determining the SS block index based at least in part on the TSS; and communicating with a base station based on the SS block index.

In some aspects, a wireless communication device for wireless communication may include memory and one or more processors operatively coupled to the memory, the memory and the one or more processors may be configured to receive a SS block including a TSS and a PBCH, wherein the TSS may include information that identifies a SS block index associated with the SS block, and wherein the TSS may be frequency division multiplexed with the PBCH in two or more OFDM symbols of the SS block, and wherein the PBCH may be scrambled based at least in part the SS block index; determine the SS block index based at least in part on the TSS; and communicate with a base station based on the SS block index.

In some aspects, a non-transitory computer-readable medium may store one or more instructions for wireless communication. The one or more instructions, when executed by one or more processors of a wireless communication device, may cause the one or more processors to receive a SS block including a TSS and a PBCH, wherein the TSS may include information that identifies a SS block index associated with the SS block, and wherein the TSS may be frequency division multiplexed with the PBCH in two or more OFDM symbols of the SS block, and wherein the PBCH may be scrambled based at least in part the SS block index; determine the SS block index based at least in part on the TSS; and communicate with a base station based on the SS block index.

In some aspects, an apparatus for wireless communication may include means for receiving a SS block including a TSS and a PBCH, wherein the TSS may include information that identifies a SS block index associated with the SS block, and wherein the TSS may be frequency division multiplexed with the PBCH in two or more OFDM symbols of the SS block, and wherein the PBCH may be scrambled based at least in part the SS block index; means for determining the SS block index based at least in part on the TSS; and means for communicating with a base station based on the SS block index.

Aspects generally include a method, apparatus, system, computer program product, non-transitory computer-readable medium, base station, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with certain aspects of the present disclosure.

FIG. 8 is a diagram illustrating an example of an uplink (UL)-centric subframe, in accordance with certain aspects of the present disclosure.

FIG. 18 is a diagram illustrating another example process performed, for example, by a user equipment, in accordance with various aspects of the present disclosure.

DETAILED DESCRIPTION

Figure 1:
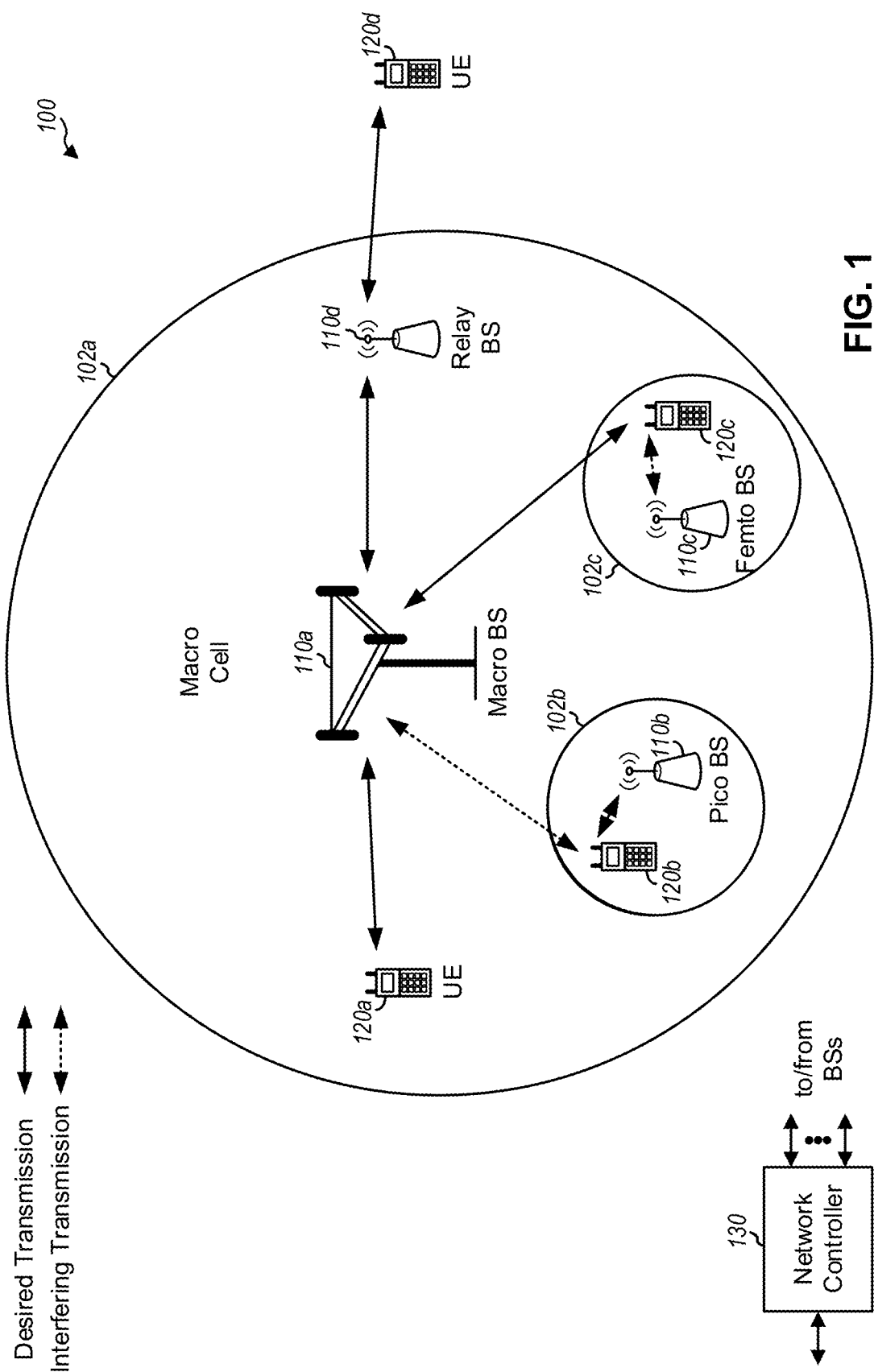
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an LTE network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing 120' that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
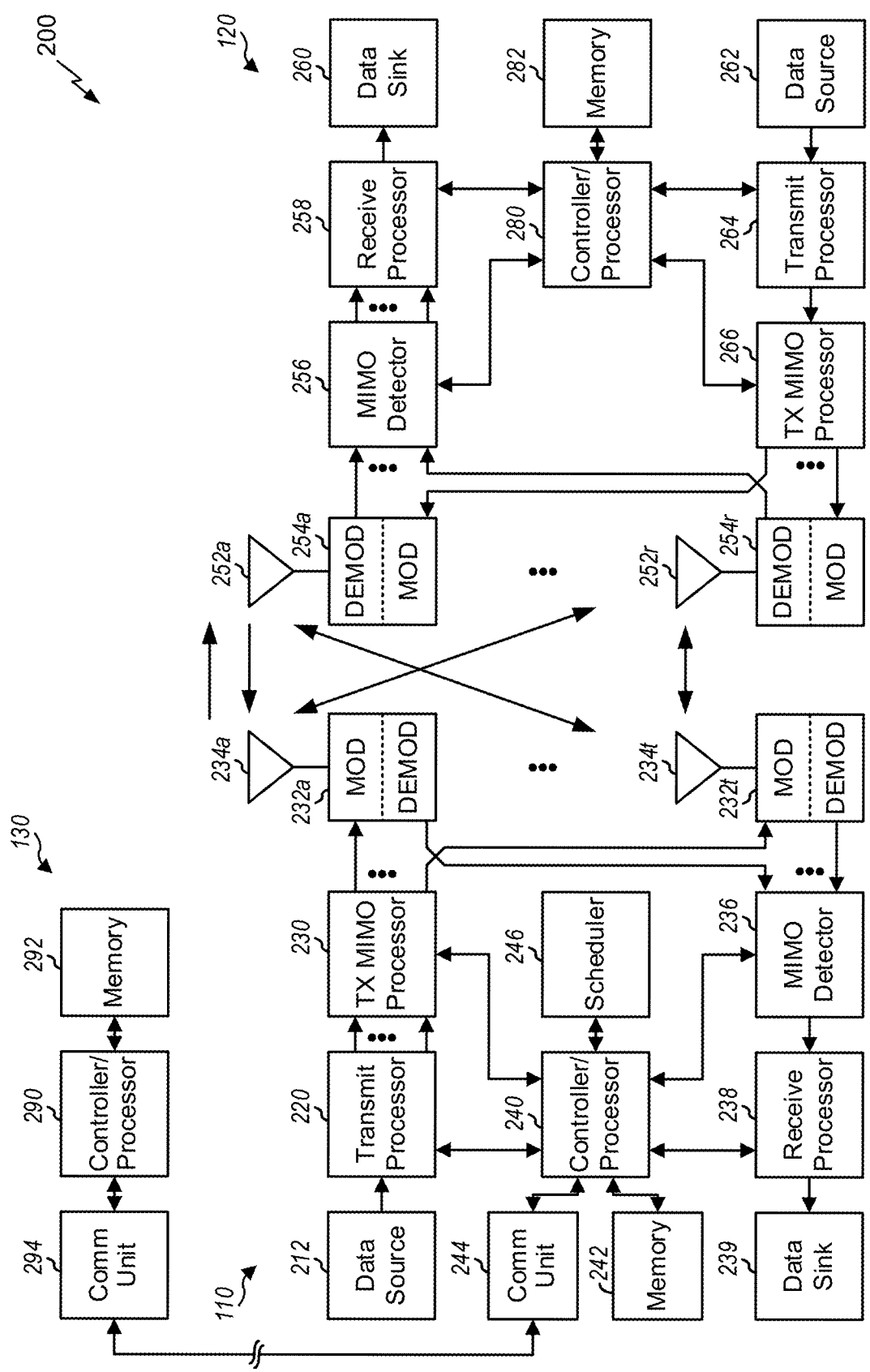
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS), the secondary synchronization signal (SSS), the tertiary synchronization signal (TSS), and/or the like). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform operations associated with TSS transmission and reception, respectively, for NR, as described herein. For example, controller/processor 240 and/or other processors and modules at base station 110, may perform or direct operations of base station 110 to perform one or more operations associated with identifying a synchronization signal (SS) block index associated with a SS block to be transmitted by base station 110, determining a TSS based at least in part on the SS block index, and transmitting the SS block including the TSS. For example, controller/processor 240 and/or other controllers/processors and modules at base station 110 may perform or direct operations of, for example, process 1100 of FIG. 11, process 1200 of FIG. 12, process 1300 of FIG. 13, process 1400 of FIG. 14 and/or other processes as described herein. In some aspects, one or more of the components shown in FIG. 2 may be employed to perform example process 1100, example process 1200, example process 1300, example process 1400, and/or other processes for the techniques described herein. As another example, controller/processor 280 and/or other processors and modules at UE 120, may perform or direct operations of UE 120 to perform one or more operations associated with receiving a synchronization signal (SS) block including a TSS, determining the TSS based at least in part on the SS block, and identifying a SS block index, associated with the SS block, based at least in part on the TSS. For example, controller/processor 280 and/or other controllers/processors and modules at UE 120 may perform or direct operations of, for example, process 1500 of FIG. 15, process 1600 of FIG. 16, process 1700 of FIG. 17, process 1800 of FIG. 18, and/or other processes as described herein. In some aspects, one or more of the components shown in FIG. 2 may be employed to perform example process 1500, example process 1600, example process 1700, example process 1800, and/or other processes for the techniques described herein. Memories 242 and 282 may store data and program codes for base station 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3A:
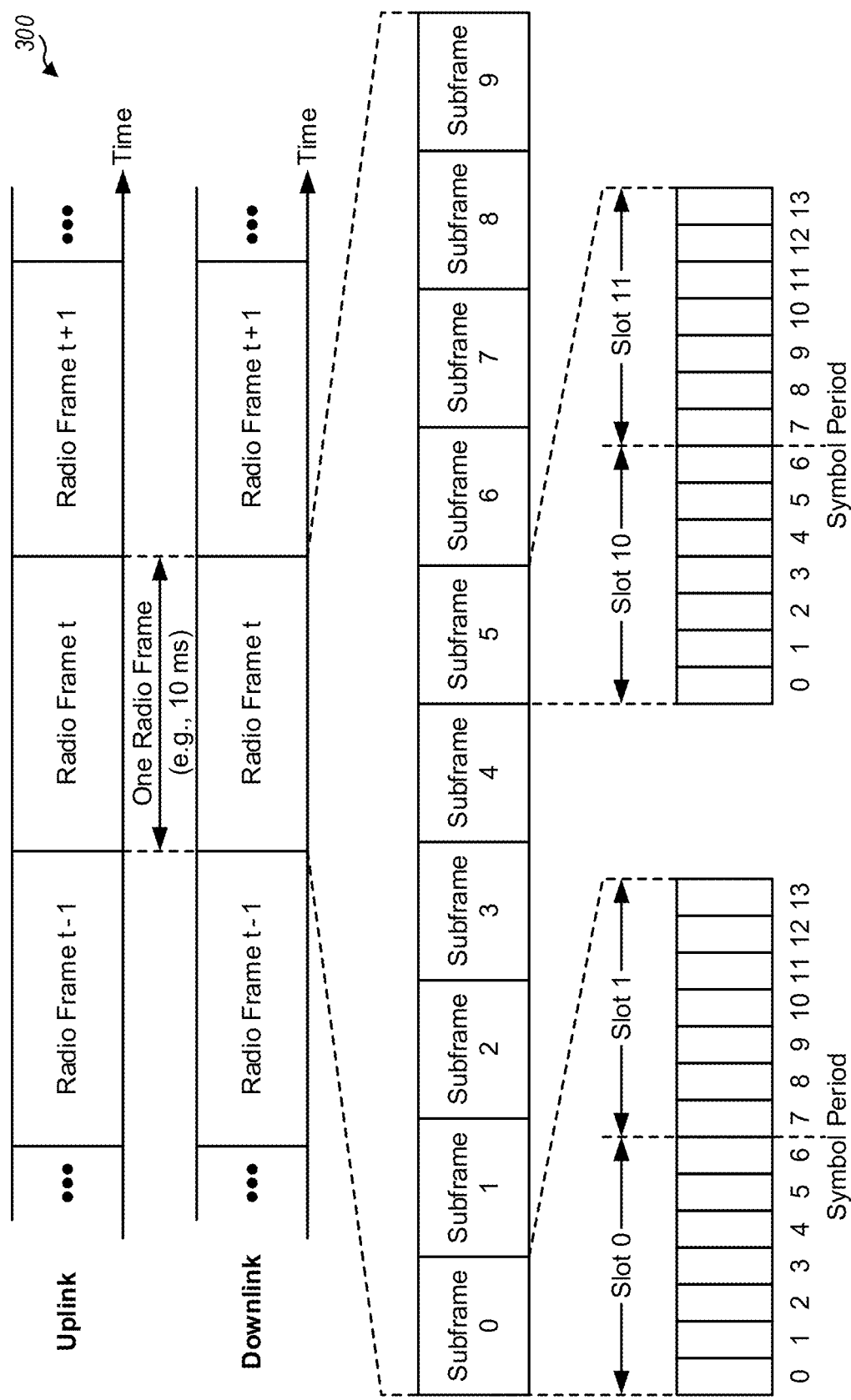
FIG. 3A is a block diagram conceptually illustrating an example of a frame structure in a wireless communication network, in accordance with certain aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., NR), a BS may transmit a primary synchronization signal (PSS), a secondary synchronization signal (SSS), and tertiary synchronization signal (TSS) on the downlink for each cell supported by the BS. The PSS and SSS may be used by UEs for cell search and acquisition. For example, the PSS may be used by UEs to determine symbol timing, and the SSS may be used by UEs to determine a physical cell identifier, associated with the BS, and frame timing. A TSS may be used by UEs to identify a beam associated with the PSS and/or the SSS. For example, in a case where the BS and a UE communicate using a multi-beam communication technique (e.g., whereby the BS communicates with the UE via multiple beams), the BS may transmit a TSS that may be used by the UE to identify the beam associated with the PSS and/or the SSS, as described in further detail below. The BS may also transmit a physical broadcast channel (PBCH). The PBCH may carry some system information, such as system information that supports initial access by UEs. In some aspects, the TSS may be a PBCH DMRS.

Figure 3B:
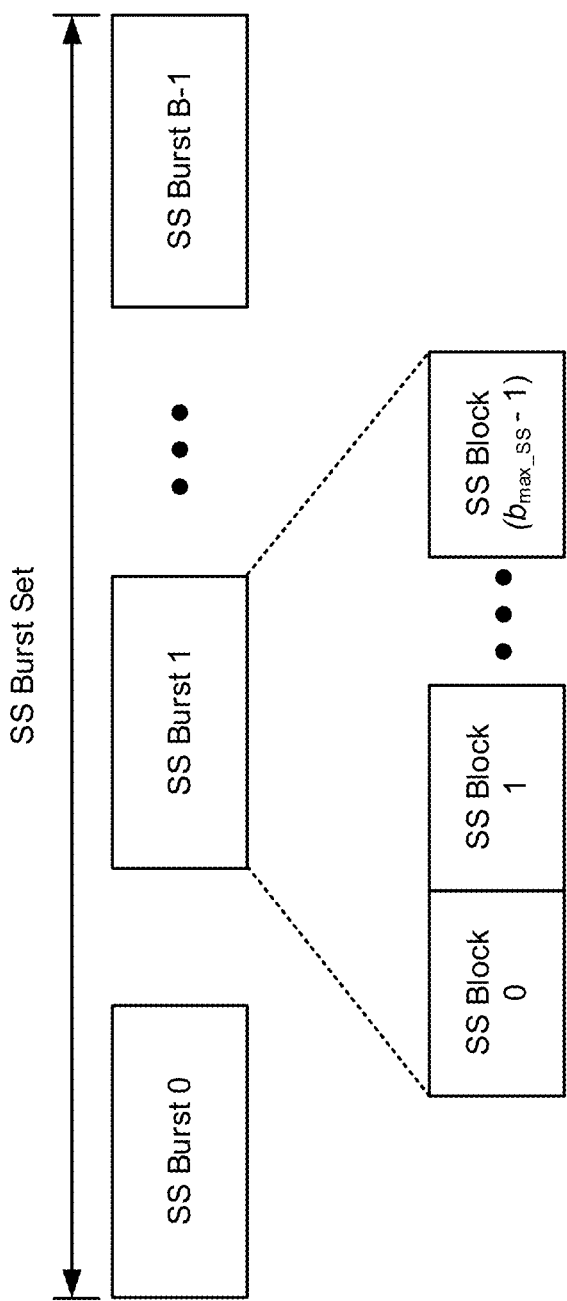
FIG. 3B is a block diagram conceptually illustrating an example SS hierarchy in a wireless communication network, in accordance with certain aspects of the present disclosure.

In some aspects, the base station may transmit the PSS, the SSS, the TSS, and the PBCH in accordance with a SS hierarchy including multiple SS blocks. FIG. 3B is a block diagram conceptually illustrating an example SS hierarchy. As shown in FIG. 3B, the SS hierarchy may include a SS burst set including a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of beams that can be carried by a SS burst.

In some aspects, a SS block is a set of resources that carries the PSS, the SSS, a TSS, and the PBCH. In some aspects, the TSS (i.e., each SS block) signals a SS block index that identifies a beam used to transmit the SS block. In some aspects, each SS block may include a different TSS (e.g., when a different beam is used to transmit each SS block). In some aspects, one or more SS blocks are included in a SS burst, and the PSS, the SSS, and the PBCH may be the same across each SS block of the SS burst. In some aspects, the SS block may be at least four symbol periods in length, where each symbol carries one or more of the PSS, the SSS, the TSS, and/or the PBCH.

As further shown in FIG. 3B, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst.

In some aspects, the SS burst set may have a burst set periodicity, whereby the SS bursts of the SS burst set are transmitted by the BS according to the fixed burst set periodicity. In other words, the SS bursts may be repeated during each SS burst set.

Additional as described above, in some aspects, a SS block may carry the PSS, the SSS, a TSS associated with the SS block, and the PBCH. In some aspects, the PSS, the SSS, and/or the PBCH may be the same within each SS block of at least one SS burst of a SS burst set.

In some aspects, the TSS may vary among different SS blocks of the at least one SS burst. For example, a first TSS (e.g., included in a first SS block) may signal a first SS block index that identifies a first beam, of multiple beams associated with the BS, with which the first SS block is associated. Here, a second TSS (e.g., included in a second SS block) may signal a second SS block index that identifies a second beam, of the multiple beams associated with the BS, with which the second SS block is associated.

In some aspects, a UE may use a TSS, included in a SS block, to determine the SS block index and identify the SS block as being associated with a particular beam. Such information may be needed by the UE in order to transmit an UL signal (e.g., a random access signal associated with a RACH process) in an appropriate direction and/or to allow the UE to determine a slot timing associated with the beam. Additional details regarding transmission and reception of SS blocks, including the PSS, the SSS, the TSS, and the PBCH, are described below.

The BS may transmit other system information such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIGS. 3A and 3B are provided merely as examples. Other examples are possible and may differ from what was described with regard to FIGS. 3A and 3B.

Figure 4:
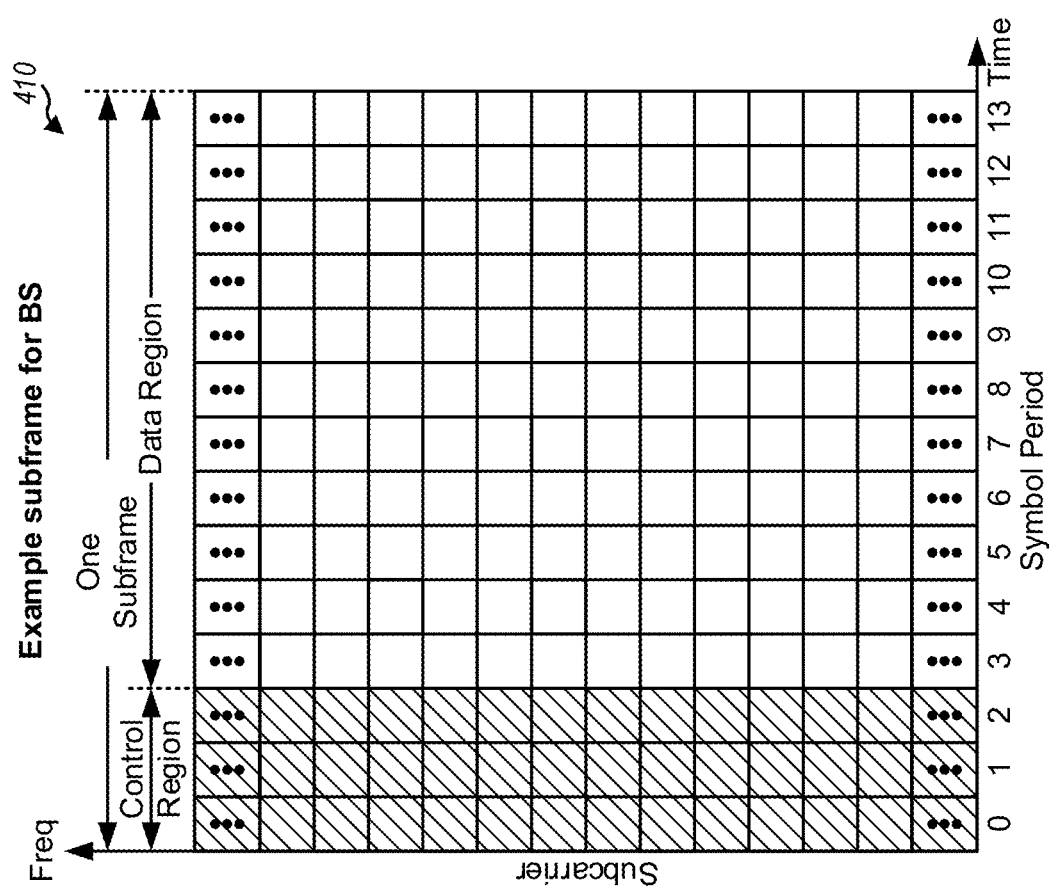
FIG. 4 is a block diagram conceptually illustrating two example subframe formats with the normal cyclic prefix, in accordance with certain aspects of the present disclosure.

FIG. 4 shows an example subframe format 410 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value. In some aspects, subframe format 410 may be used for transmission of SS blocks that carry the PSS, the SSS, the TSS, and the PBCH, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q $\in$ {0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
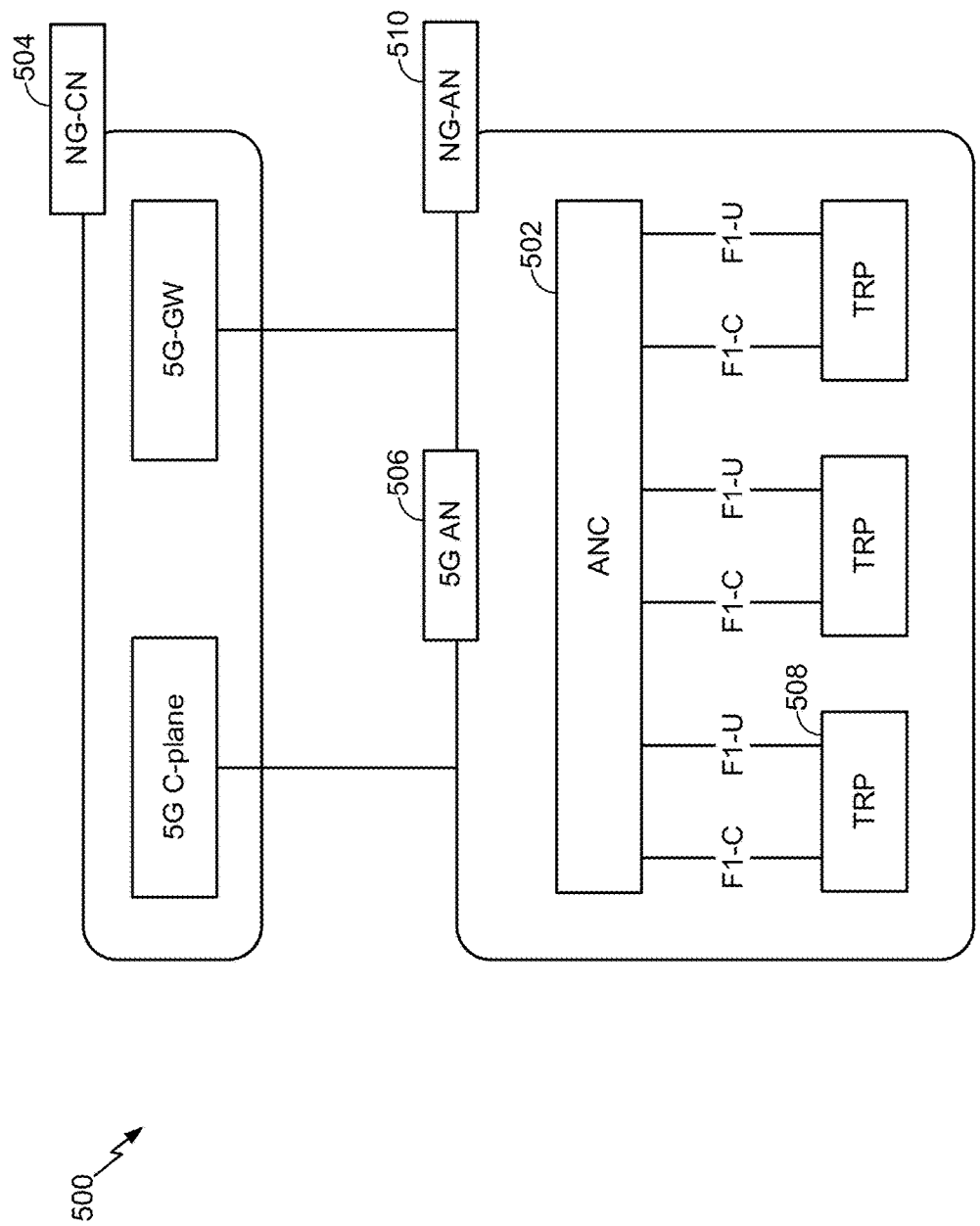
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
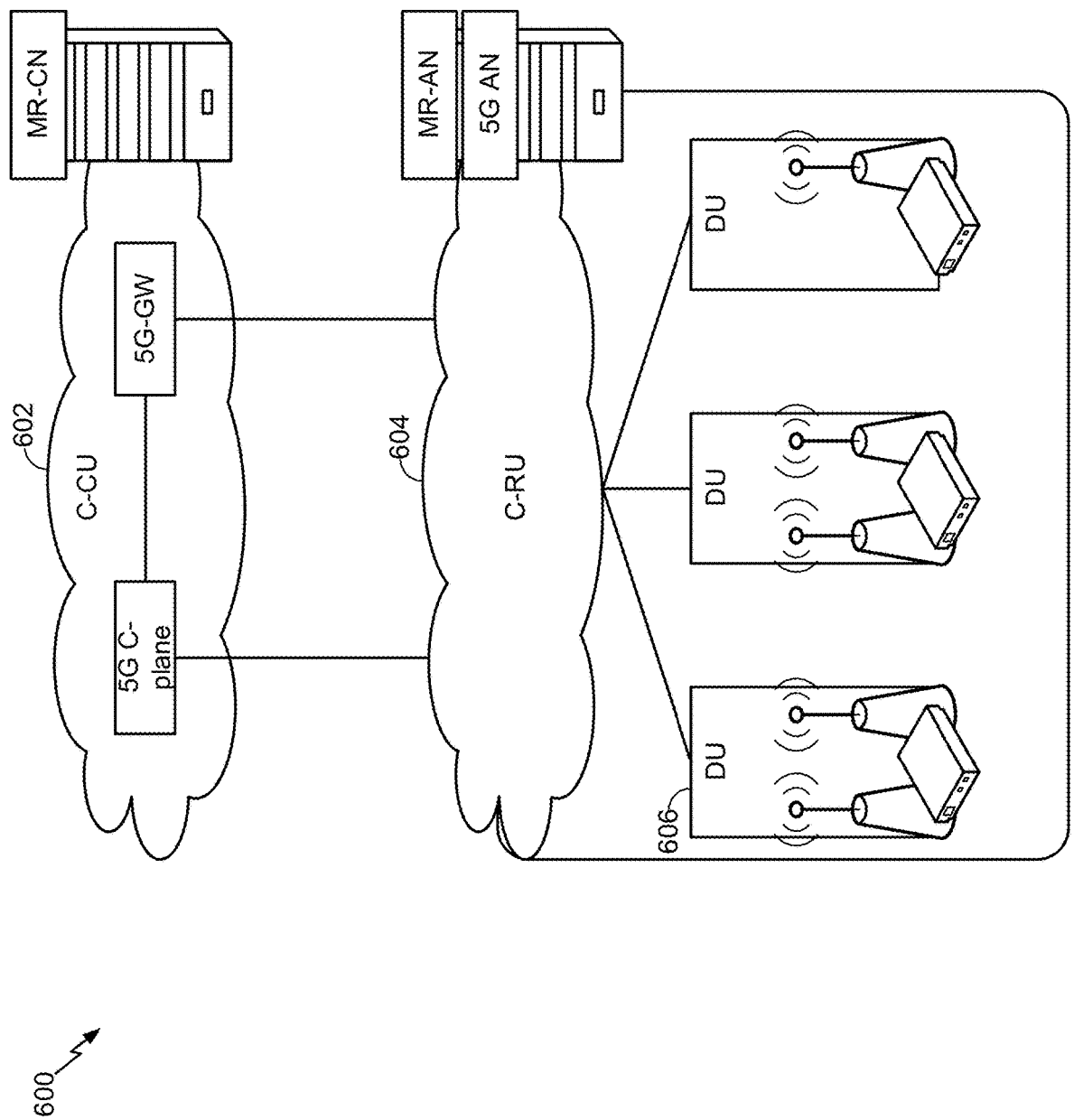
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A wireless communication standard, such as NR, may allow for multi-beam communication between a base station and a UE. In such a case, the base station may be capable of transmitting different information to the UE via multiple beams. In order to utilize such multi-beam communication, the UE needs to determine a PSS, a SSS, and a PBCH associated with each beam (e.g., in order to synchronize with the base station, receive system information, and/or initiate a random access procedure on a per beam basis). Thus, the base station should transmit, using each beam, the PSS, the SSS, and the PBCH. However, each such transmission of the PSS, the SSS, and the PBCH should include information that allows the UE to identify a beam associated with the transmission in order to permit multi-beam communication via the multiple beams.

Implementations described herein provide a tertiary synchronization signal (TSS) design for NR. In some aspects, the TSS may signal a SS block index, corresponding to a particular beam with which a given SS block (i.e., a transmission of a PSS, a SSS, and a PBCH) is associated. Thus, the TSS allows a UE to identify the SS block as being associated with the particular beam. In some aspects, use of the TSS to signal the SS block index reduces complexity of processing required by the UE, reduces an amount of time required to identify the beam, and/or reduces power consumption of the UE as compared to other techniques (e.g., implicitly or explicitly indicating the beam in the PBCH, indicting the beam in a NR-SS, and/or the like).

Figure 9:
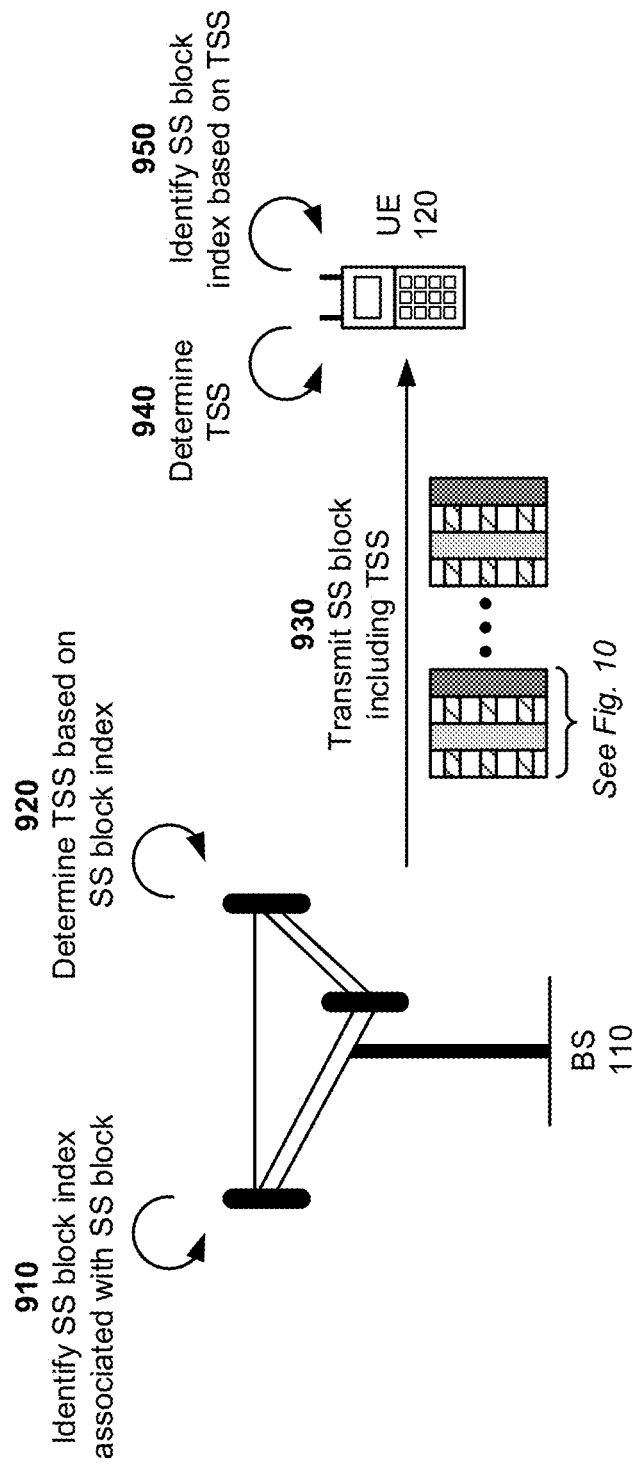
FIG. 9 is a diagram illustrating an example of a base station transmitting, and UE receiving a SS block, associated with a beam, that includes a PSS, a SSS, a PBCH, and a TSS for identifying the beam, in accordance with various aspects of the present disclosure.

FIG. 9 is a diagram illustrating an example 900 of a base station transmitting, and UE receiving, a SS block, associated with a beam, that includes a PSS, a SSS, a PBCH, and a TSS for identifying the beam, in accordance with various aspects of the present disclosure.

As shown in FIG. 9, and by reference number 910, a base station (e.g., BS 110) may identify a SS block index associated with a SS block. The SS block index includes information that identifies the particular beam used to transmit the SS block to UE 120. As described above, the SS block is a set of resources that carries the PSS, the SSS, a TSS that signals the SS block index corresponding to the beam used to transmit the SS block, and the PBCH. In some aspects, the TSS may allow UE 120 to identify the particular beam associated with the SS block, as described below.

In some aspects, BS 110 may identify the SS block index based at least in part on information stored or accessible by BS 110. For example, BS 110 may store or have access to information associating the SS block index with a particular beam. Here, when BS 110 is to transmit a SS block using the particular beam, BS 110 may identify the SS block as being associated with the particular beam using the SS block index.

In some aspects, BS 110 may identify multiple SS block indices associated with multiple SS blocks, each associated with a different beam. For example, BS 110 may be capable of communicating with UE 120 via a first beam and a second beam. Here, in order to permit multi-beam communication via the first beam and the second beam, the BS 110 may need to transmit a first SS block, associated with the first beam, and a second SS block associated with the second beam. In this example, BS 110 may identify (e.g., based at least in part on information accessible by BS 110) a first SS block index that is an identifier for the first beam and a second SS block index that is an identifier for the second beam, and may associate the first and second SS block indices with the first and second SS blocks, respectively.

As further shown in FIG. 9, and by reference number 920, BS 110 may determine a TSS based at least in part on the SS block index. As described above, a TSS may signal the SS block index associated with the SS block (e.g., in order to allow UE 120 identify the SS block as being associated with a particular beam).

In some aspects, BS 110 may determine a payload-based TSS. A payload-based TSS may include a set of bits that corresponds to the SS block index associated with the SS block. For example, the payload-based TSS may include five bits, eight bits, and/or the like, that correspond to the SS block index associated with the SS block. In some aspects, the set of bits may be protected by one or more cyclic redundancy check (CRC) bits associated with verifying the SS block index. In such a case, upon receiving the SS block, determining the set of bits, and identifying the SS block index, UE 120 may verify the SS block index using the CRC bit(s), as described below.

Additionally, or alternatively, BS 110 may determine a sequence-based TSS. A sequence-based TSS may include a sequence that corresponds to the SS block index associated with the SS block. For example, the sequence-based TSS may be a sequence generated based at least in part on an m-sequence, a Zadoff-Chu sequence, or another type of pseudo-noise sequence.

In some aspects, BS 110 may determine the sequence based at least in part on a cyclic shift, corresponding to the SS block index, with respect to a base sequence. For example, BS 110 may store or have access to information associating a cyclic shift associated with the SS block index. Here, BS 110 may determine the TSS based at least in part on applying the cyclic shift to the base sequence. In this example, upon receiving the SS block and determining the cyclic shift of the sequence with respect to the base sequence, UE 120 may identify the SS block index associated with the SS block (e.g., based at least in part on the cyclic shift), as described below.

In some aspects, use of the sequence-based TSS may reduce complexity, resource consumption, and/or the like, by UE 120 when determining the TSS (e.g., as compared to the payload-based TSS) since UE 120 need only perform correlation associated with the sequence, and does need not perform channeling decoding, demodulation, or the like. In some aspects, a TSS detector of UE 120, associated with determining the sequence-based TSS, may be configured with a threshold target false alarm rate (e.g., 0.1%) that allows UE 120 to detect an error and/or verify the sequence determined by UE 120 (e.g., since CRC verification may not be performed for the sequence-based TSS).

In some aspects, BS 110 may convey a portion of the SS block index. For example, BS 110 may scramble the PBCH based at least in part on the SS block index. In such a case, if UE 120 successfully descrambles the PBCH based at least in part on the SS block index, the UE 120 may verify the SS block index.

In some aspects, the sequence may be a short sequence (e.g., of length 31) or multiple short sequences (e.g., each of length 31). For example, in some aspects, the sequence may include a first short sequence and a second short sequence. In such a case, the first short sequence may be transmitted in one OFDM symbol of the SS block, while the second short sequence may be transmitted in another OFDM symbol of the SS block. In some aspects, use of different short sequences allows for expanded spacing between sequences used to signal SS block indices (e.g., since combinations of different sequences may be used to signal SS block indices), thereby reducing a likelihood of UE 120 to experience an error when identifying the SS block index. As another example, the sequence may be a single short sequence. In this example, the single short sequence may be transmitted in multiple (e.g., two or more) OFDM symbols of the SS block. In some aspects, repeating the single sequence in the SS block provides increased reliability when signaling the SS block index.

In some aspects, the sequence may include a long sequence (e.g., of length 63). In such a case, the long sequence may be mapped across two or more OFDM symbols of the SS block. In some aspects, use of the long sequence allows additional beams to be signaled (e.g., as compared to using short sequences).

In some aspects, the sequence-based TSS is indicative of a portion of the SS block index, while another portion of the SS block index is conveyed as a payload of PBCH. In some aspects, the TSS allows UE 120 to demodulate the PBCH and, therefore, functions as a PBCH DMRS.

As further shown in FIG. 9, and by reference number 930, BS 110 may transmit the SS block including the TSS. For example, BS 110 may transmit the SS block including the PSS, the SSS, the TSS, and the PBCH. In some aspects, BS 110 may transmit the SS block in accordance with a SS block structure, as described in further detail below.

In some aspects, BS 110 may transmit the SS block in accordance with the SS hierarchy described above with regard FIG. 3B. For example, BS 110 may transmit a first SS burst, associated with a SS burst set, including the SS block and one or more other SS blocks (e.g., each including the PSS, the SSS, a TSS associated with a respective beam, and the PBCH). In this example, BS 110 may transmit a second SS burst, associated with the SS burst set and repeating the SS block and the one or more other SS blocks, after a SS burst period has lapsed. BS 110 may continue transmitting such SS bursts in accordance with the SS burst set periodicity. In some aspects, the TSS may be transmitted in multiple SS blocks (e.g., in multiple respective SS bursts in one or more SS burst sets) in order to permit UE 120 to soft-combine the repetitions of the TSS in the multiple SS blocks. Soft-combining the repetitions of the TSS in the multiple SS blocks enhances, for example, TSS decoding reliability.

Figure 10:
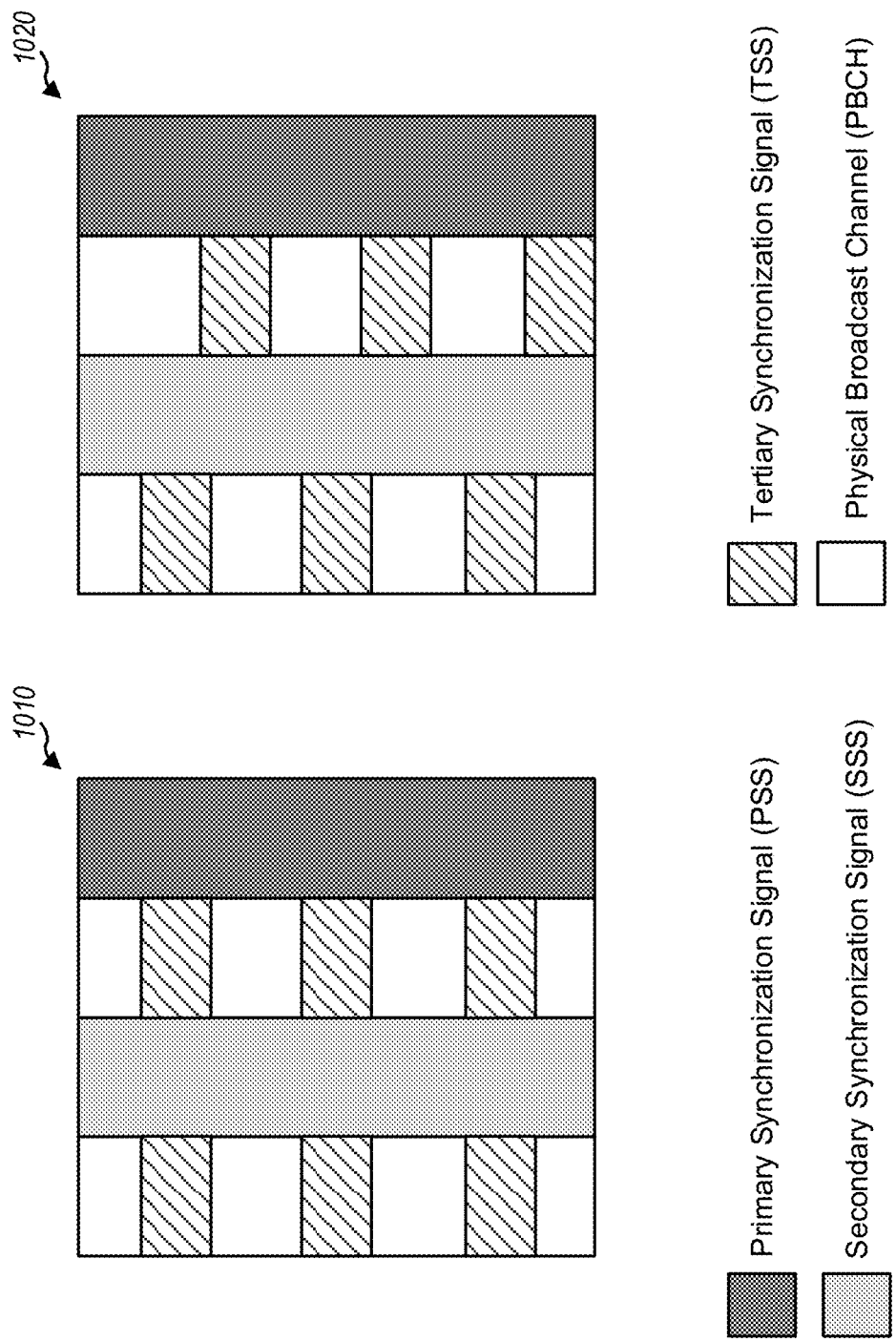
FIG. 10 is a block diagram conceptually illustrating example SS block structures in a wireless communication network, in accordance with certain aspects of the present disclosure.

In some aspects, BS 110 may transmit the SS block in accordance with a particular SS block structure. FIG. 10 is a diagram conceptually illustrating example SS block structures 1010 and 1020 for SS blocks transmitted by BS 110.

As shown in FIG. 10, SS block structure 1010 may span at least four symbols (e.g., where each column of SS block structures 1010 and 1020 correspond to a symbol period). As shown, SS block structure 1010 may include a second symbol including the SSS and a fourth symbol including the PSS.

As further shown, the TSS and the PBCH may be included in a first symbol and a third symbol of SS block structure 1010. For example, the first symbol may include a first portion of the TSS (e.g., a first portion of the set of bits, a first portion of the sequence) and a first portion of the physical PBCH, where the first portion of the TSS and the first portion of the PBCH are frequency division multiplexed in the first symbol. Similarly, the third symbol may including a second portion of the TSS (e.g., a second portion of the set of bits, a second portion of the sequence) and a second portion of the PBCH, where the second portion of the TSS and the second portion of the PBCH are frequency division multiplexed in the third symbol.

In some aspects, the TSS may be included in approximately 25% of the resource elements of a symbol used to transmit the TSS. For example, if 127 resource elements are used for one OFDM symbol, then a portion of the TSS, included in the symbol, may use 31 resource elements of the OFDM symbol.

In some aspects, when the TSS is a payload-based TSS or when the TSS is a sequenced-based TSS, the TSS and the PBCH use a same numerology, a same modulation and channel coding scheme, and/or a same transmit diversity scheme. In some aspects, as shown in SS block structure 1010, frequency locations of the first portion of the TSS in the first symbol match frequency locations of the second portion of the TSS in the third symbol.

In some aspects, BS 110 may scramble the TSS based at least in part on a physical cell identifier, associated with BS 110, in order to allow UE 120 to verify the TSS. In such a case, UE 120 may determine the physical cell identifier (e.g., based at least in part on the PSS and the SSS), and may descramble the TSS based at least in part on the physical cell identifier. Here, UE 120 may verify the physical cell identifier if a valid TSS is descrambled based at least in part on the physical cell identifier.

In some aspects, BS 110 may modulate the TSS based at least in part on the SSS. For example, BS 110 may use the SSS as a phase reference (e.g., a DMRS) for modulating the TSS. In such a case, UE 120 may determine the SSS (e.g., based at least in part on the PSS), and use the SSS for demodulating the TSS. In some aspects, the TSS and the SSS may be transmitted using a same antenna port.

In some aspects, BS 110 may modulate the PBCH based at least in part on the TSS and/or the SSS. For example, BS 110 may use the TSS and the SSS as a phase reference (e.g., a DMRS) for modulating the PBCH. In such a case, UE 120 may determine the TSS and the SSS, and use the TSS and the SSS for demodulating the PBCH. As another example, BS 110 may use the TSS as a phase reference (e.g., DMRS) for modulating the PBCH. In other words, the TSS may be a PBCH DMRS, in some aspects. In such a case, UE 120 may determine the TSS (i.e., the PBCH DMRS), and use the TSS for demodulating the PBCH.

In some aspects, BS 110 may scramble the PBCH based at least in part on the SS block index in order to provide SS block index verification. In such a case, UE 120 may determine the SS block index (e.g., based at least in part on the TSS), and may descramble the PBCH based at least in part on the SS block index. Here, UE 120 may verify the SS block index if a valid PBCH is descrambled based at least in part on the SS block index. In a case where the TSS is not self-verifying (e.g., when the TSS is a sequence-based TSS) scrambling the PBCH based at least in part on the SS block index may serve as a verification of the SS block index.

Additionally, or alternatively, BS 110 may scramble the PBCH based at least in part on the physical cell identifier in order to provide physical cell identifier verification. In such a case, UE 120 may determine the physical cell identifier (e.g., based at least in part on the SSS and the PSS), and may descramble the PBCH based at least in part on the physical cell identifier. Here, UE 120 may verify the physical cell identifier if a valid PBCH is descrambled based at least in part on the physical cell identifier. In some aspects, BS 110 may scramble the PBCH based at least in part on both the SS block index and the physical cell identifier.

SS block structure 1020 is similar to SS block structure 1010. However, as shown in SS block structure 1020, in some aspects, frequency locations of the first portion of the TSS in the first symbol may be different from frequency locations of the second portion of the TSS in the third symbol. In some aspects, using different frequency locations (i.e., frequency hopping) for the frequency division multiplexed portions of the TSS and the PBCH increases frequency hopping diversity gain (e.g., as compared to using the same frequency locations in the two or more symbols).

Notably, while SS block structures 1010 and 1020 show the TSS and the PBCH as being frequency division multiplexed in two symbols, in some aspects, the TSS and the PBCH may be multiplexed in more than two symbols. For example, the SS block structure may include another symbol including a third portion of the TSS and a third portion of the PBCH, where the third portion of the TSS and the third portion of the PBCH are frequency division multiplexed in the other symbol.

As indicated above, FIG. 10 is provided as an example. Other examples are possible and may differ from what was described with respect to FIG. 10.

Returning to FIG. 9, and as shown by reference number 940, UE 120 may receive the SS block transmitted by BS 110 and may determine the TSS based at least in part on the SS block. For example, UE 120 may receive the SS block, determine the PSS, determine the SSS based at least in part on the PSS, and determine the TSS based at least in part on the PSS and the SSS. In some aspects, UE 120 may determine the PBCH based at least in part on the TSS and/or the SSS. For example, if the PBCH is modulated based at least in part on the TSS and the SSS, then UE 120 may demodulate the PBCH based at least in part on the TSS and the SSS.

In some aspects, UE 120 may descramble the TSS based at least in part on a physical cell identifier associated with BS 110. For example, UE 120 may determine the physical cell identifier based at least in part on the PSS and the SSS. Here, if BS 110 scrambles the TSS based at least in part on the physical cell identifier, then UE 120 may descramble the TSS based at least in part on the physical cell identifier.

In some aspects, UE 120 may determine the TSS based at least in part on soft-combining repetitions of the TSS received in multiple SS blocks. As described above, soft-combining the repetitions of the TSS in the multiple SS blocks enhances, for example, TSS decoding reliability.

As further shown in FIG. 9, and by reference number 950, UE 120 may identify the SS block index based at least in part on the TSS. For example, if the TSS is a payload-based TSS, then UE 120 may determine the set of bits, and identify the SS block index based at least in part on the set of bits (e.g., when UE 120 stores or has access to information associating sets of bits with SS block indices). UE 120 may then identify the beam, associated with the SS block, based at least in part on the SS block index. In this example, UE 120 may verify the SS block index based at least in part on one or more cyclic redundancy check bits appended to the set of bits.

As another example, if the TSS is a sequence-based TSS, then UE 120 may determine the sequence, and identify the SS block index based at least in part on the sequence. For example, UE 120 may determine a cyclic shift, associated with the sequence, with respect to a sequence. Here, UE 120 may identify the SS block index based at least in part on the cyclic shift (e.g., when UE 120 stores or has access to information associating cyclic shifts with SS block indices). UE 120 may then identify the beam, associated with the SS block, based at least in part on the SS block index.

As another example, if a portion of the SS block index is conveyed by the PBCH, UE 120 can demodulate the PBCH based at least in part on the TSS (i.e., PBCH DMRS). Here, bits conveyed by the PBCH and the TSS can be combined in order to identify the SS block index (e.g., three bits from the PBCH and three bits from the TSS can be combined to identify a six bit SS block index).

In some aspects, UE 120 may perform one or more actions based at least in part on identifying the SS block index. For example, UE 120 may communicate with BS 110 based on the SS block index. As a particular example, UE 120 may acquire a system based at least in part on the SS block index (e.g., based at least in part on identifying the beam associated with the SS block index). As another example, UE 120 may send a measurement report, including the SS block index (and the physical cell identifier) to BS 110.

In some aspects, UE 120 may descramble the PBCH based at least in part on the SS block index. For example, BS 110 may scramble the PBCH based at least in part on the SS block index, as described above. Here, UE 120 may determine the SS block index, and descramble the PBCH based at least in part on the SS block index. In some aspects, UE 120 may verify the SS block index based at least in part on descrambling the PBCH (e.g., when UE 120 successfully descrambles the PBCH based at least in part on the SS block index, the SS block index is verified as correct).

In some aspects, UE 120 may descramble the PBCH based at least in part on the physical cell identifier. For example, BS 110 may scramble the PBCH based at least in part on the physical cell identifier, as described above. Here, UE 120 may determine the physical cell identifier, and descramble the PBCH based at least in part on the physical cell identifier. In some aspects, UE 120 may verify the physical cell identifier based at least in part on descrambling the PBCH (e.g., when UE 120 successfully descrambles the PBCH based at least in part on the physical cell identifier, the physical cell identifier is verified as correct). In some aspects, UE 120 may descramble the PBCH based at least in part on the SS block index and the physical cell identifier (e.g., when BS 110 scrambles the PBCH based at least in part on the SS block index and the physical cell identifier, as described above).

In some aspects, UE 120 may perform one or more of the above described operations for other SS blocks received by UE 120.

As indicated above, FIG. 9 is provided as an example. Other examples are possible and may differ from what was described with respect to FIG. 9.

Figure 11:
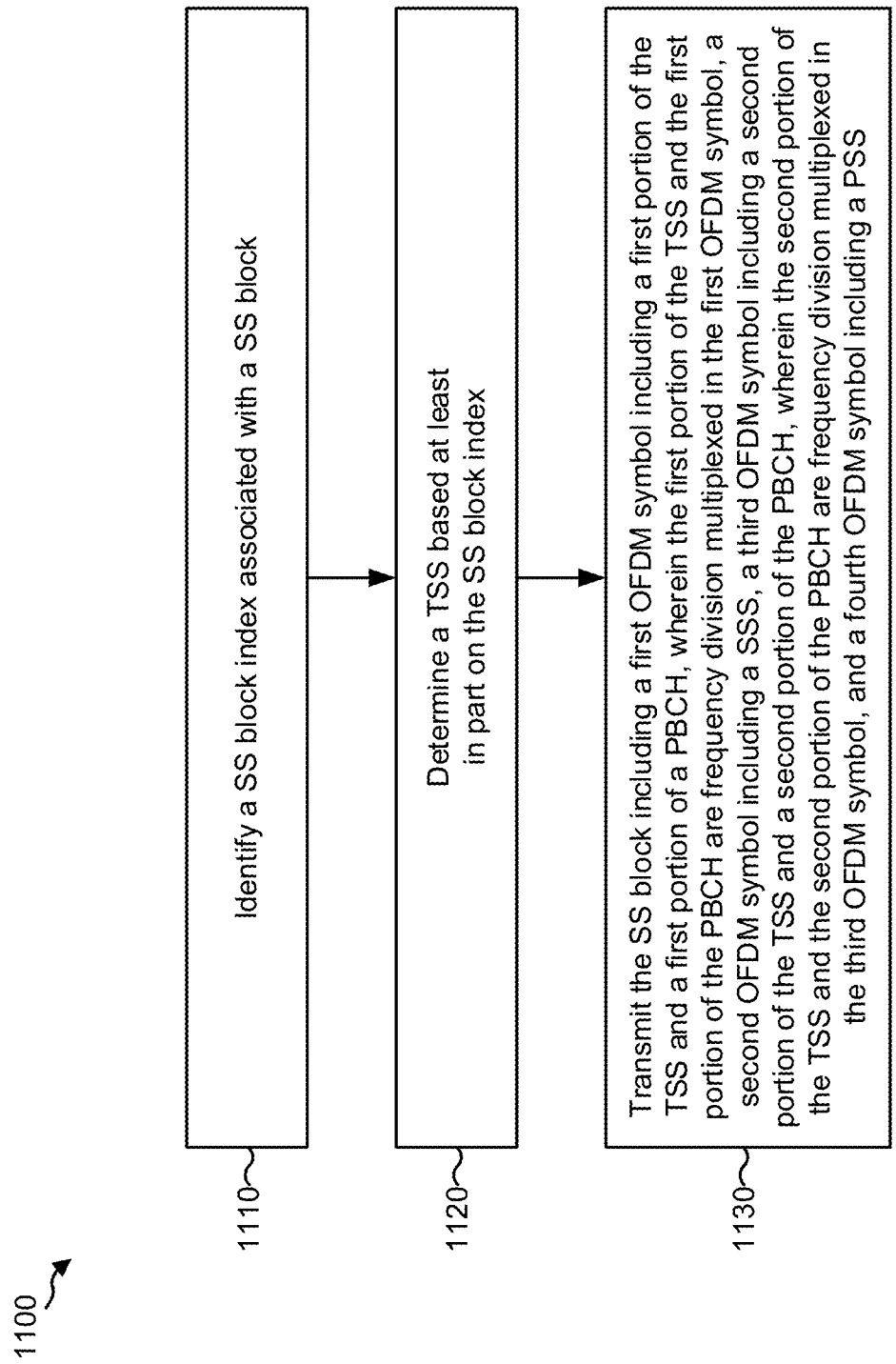
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure.

As shown in FIG. 11, in some aspects, process 1100 may include identifying a SS block index associated with a SS block (block 1110). For example, BS 110 may identify a SS block index associated with a SS block, as described above.

As further shown in FIG. 11, in some aspects, process 1100 may include determining a TSS based at least in part on the SS block index (block 1120). For example, BS 110 may determine a TSS based at least in part on the SS block index, as described above.

As further shown in FIG. 11, in some aspects, process 1100 may include transmitting the SS block including a first OFDM symbol including a first portion of the TSS and a first portion of a PBCH, wherein the first portion of the TSS and the first portion of the PBCH are frequency division multiplexed in the first OFDM symbol, a second OFDM symbol including a SSS, a third OFDM symbol including a second portion of the TSS and a second portion of the PBCH, wherein the second portion of the TSS and the second portion of the PBCH are frequency division multiplexed in the third OFDM symbol, and a fourth OFDM symbol including a PSS (block 1130). For example, BS 110 may transmit the SS block, as described above.

In some aspects, the TSS may be a payload-based TSS including a set of bits that corresponds to the SS block index associated with the SS block. In some aspects, the set of bits may include a cyclic redundancy check bit associated with verifying the SS block index.

In some aspects, the TSS may be a sequence-based TSS including a sequence that corresponds to the SS block index associated with the SS block.

In some aspects, BS 110 may scramble the TSS based at least in part on a physical cell identifier associated with the base station.

In some aspects, frequency locations of the first portion of the TSS in the first OFDM symbol may match frequency locations of the second portion of the TSS in the third OFDM symbol.

In some aspects, frequency locations of the first portion of the TSS in the first OFDM symbol may be different from frequency locations of the second portion of the TSS in the third OFDM symbol.

In some aspects, BS 110 may modulate the TSS based at least in part on the SSS. In some aspects, BS 110 may modulate the PBCH based at least in part on the TSS and the SSS. In some aspects, the TSS and the SSS may be transmitted over a same antenna port.

In some aspects, the SS block may be one of a plurality of SS blocks included in a SS burst, and the SS burst is one of a plurality of SS bursts included in a SS burst set.

In some aspects, the SS block may further include a fifth OFDM symbol including a third portion of the TSS and a third portion of the PBCH, wherein the third portion of the TSS and the third portion of the PBCH may be frequency division multiplexed in the fifth OFDM symbol.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
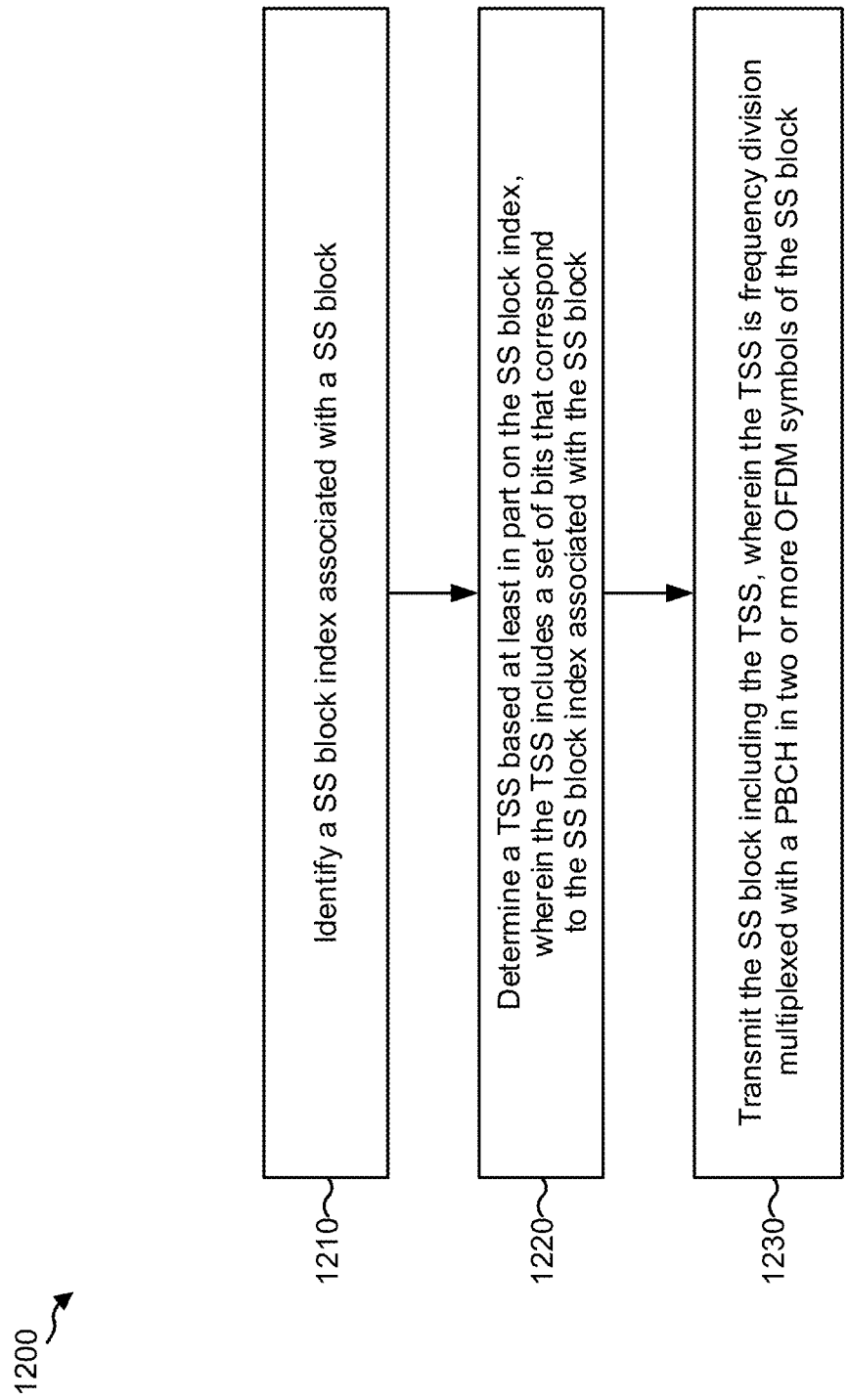
FIG. 12 is a diagram illustrating another example process performed, for example, by a base station, in accordance with various aspects of the present disclosure.

FIG. 12 is a diagram illustrating an example process 1200 performed, for example, by a base station, in accordance with various aspects of the present disclosure.

As shown in FIG. 12, in some aspects, process 1200 may include identifying a SS block index associated with a SS block (block 1210). For example, BS 110 may identify a SS block index associated with a SS block, as described above.

As further shown in FIG. 12, in some aspects, process 1200 may include determining a TSS based at least in part on the SS block index, wherein the TSS includes a set of bits that correspond to the SS block index associated with the SS block (block 1220). For example, BS 110 may determine a TSS based at least in part on the SS block index, wherein the TSS includes a set of bits that correspond to the SS block index associated with the SS block, as described above.

As further shown in FIG. 12, in some aspects, process 1200 may include transmitting the SS block including the TSS, wherein the TSS is frequency division multiplexed with a PBCH in two or more OFDM symbols of the SS block (block 1230). For example, BS 110 may transmit the SS block including the TSS, wherein the TSS is frequency division multiplexed with a PBCH in two or more OFDM symbols of the SS block, as described above.

In some aspects, the TSS and the PBCH may use a same numerology, a same modulation and channel coding scheme, and a same transmit diversity scheme.

In some aspects, the TSS may be a first TSS and the SS block may be a first SS block included in a first SS burst of a first SS burst set, and BS 110 may determine a second TSS that is to be combined with the first TSS by a user equipment and transmitting a second SS block, including the second TSS, in a second SS burst, wherein the second SS burst may be in the first SS burst set or a second SS burst set.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
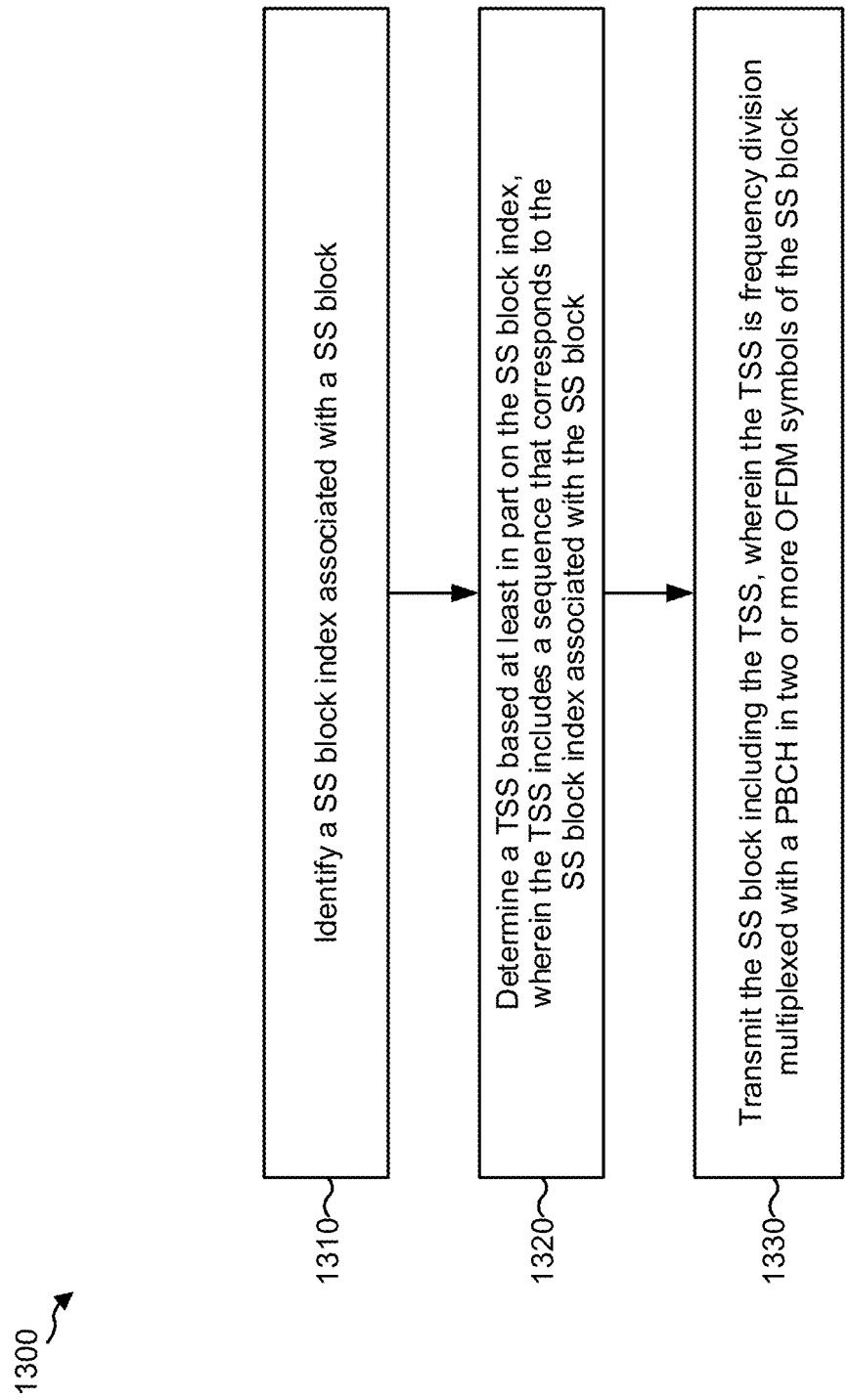
FIG. 13 is a diagram illustrating an additional example process performed, for example, by a base station, in accordance with various aspects of the present disclosure.

FIG. 13 is a diagram illustrating an example process 1300 performed, for example, by a base station, in accordance with various aspects of the present disclosure.

As shown in FIG. 13, in some aspects, process 1300 may include identifying a SS block index associated with a SS block (block 1310). For example, BS 110 may identify a SS block index associated with a SS block, as described above.

As further shown in FIG. 13, in some aspects, process 1300 may include determining a TSS based at least in part on the SS block index, wherein the TSS includes a sequence that corresponds to the SS block index associated with the SS block (block 1320). For example, BS 110 may determine a TSS based at least in part on the SS block index, wherein the TSS includes a sequence that corresponds to the SS block index associated with the SS block, as described above.

As further shown in FIG. 13, in some aspects, process 1300 may include transmitting the SS block including the TSS, wherein the TSS is frequency division multiplexed with a PBCH in two or more OFDM symbols of the SS block (block 1330). For example, BS 110 may transmit the SS block including the TSS, wherein the TSS is frequency division multiplexed with a PBCH in two or more OFDM symbols of the SS block, as described above.

In some aspects, approximately 25% of the two or more OFDM symbols may include the TSS.

In some aspects, the sequence may be based at least in part on an m-sequence, a Zadoff-Chu sequence, or another type of pseudo-noise sequence.

In some aspects, the sequence may include a first sequence and a second sequence, wherein the first sequence is different from the second sequence, wherein the first sequence is included in a first OFDM symbol of the two or more OFDM symbols, and wherein the second sequence is included in a second OFDM symbol of the two or more OFDM symbols.

In some aspects, the sequence may be a single sequence that is repeated in each of the two or more OFDM symbols.

In some aspects, the sequence may be a single sequence that is mapped across the two or more OFDM symbols.

In some aspects, BS 110 may identify a cyclic shift, corresponding to the SS block index, with respect to a base sequence, and determine the TSS based at least in part on the cyclic shift corresponding to the SS block index.

In some aspects, the TSS and the PBCH may use a same numerology, a same modulation and channel coding scheme, and a same transmit diversity scheme.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
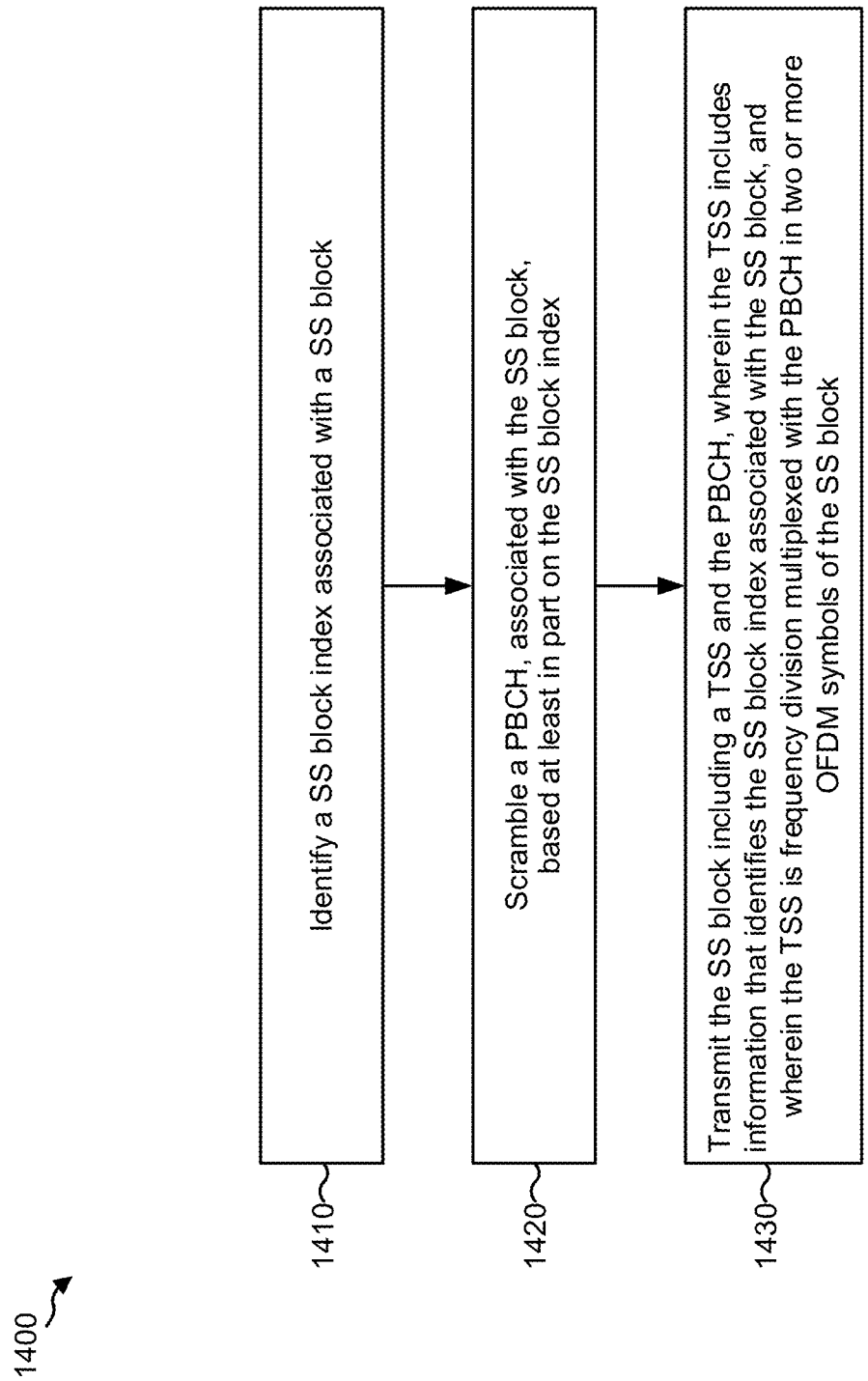
FIG. 14 is a diagram illustrating another example process performed, for example, by a base station, in accordance with various aspects of the present disclosure.

FIG. 14 is a diagram illustrating an example process 1400 performed, for example, by a base station, in accordance with various aspects of the present disclosure.

As shown in FIG. 14, in some aspects, process 1400 may include identifying a SS block index associated with a SS block (block 1410). For example, BS 110 may identify a SS block index associated with a SS block, as described above.

As further shown in FIG. 14, in some aspects, process 1400 may include scrambling a PBCH, associated with the SS block, based at least in part on the SS block index (block 1420). For example, BS 110 may scramble a PBCH, associated with the SS block, based at least in part on the SS block index, as described above.

As further shown in FIG. 14, in some aspects, process 1400 may include transmitting the SS block including a TSS and the PBCH, wherein the TSS includes information that identifies the SS block index associated with the SS block, and wherein the TSS is frequency division multiplexed with the PBCH in two or more OFDM symbols of the SS block (block 1430). For example, BS 110 may transmit the SS block including a TSS and the PBCH, wherein the TSS includes information that identifies the SS block index associated with the SS block, and wherein the TSS is frequency division multiplexed with the PBCH in two or more OFDM symbols of the SS block, as described above.

In some aspects, the PBCH is scrambled based at least in part on the SS block index to allow a user equipment to verify the SS block index.

In some aspects, BS 110 may scramble the PBCH further based at least in part on a physical cell identifier associated with the SS block. In some aspects, the PBCH may be further scrambled based at least in part on the physical cell identifier to allow a user equipment to verify the physical cell identifier.

In some aspects, the TSS is a PBCH demodulation reference signal (DMRS). In some aspects, the PBCH is modulated based at least in part on the TSS. In some aspects, the TSS is used as a phase reference for modulating the PBCH.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
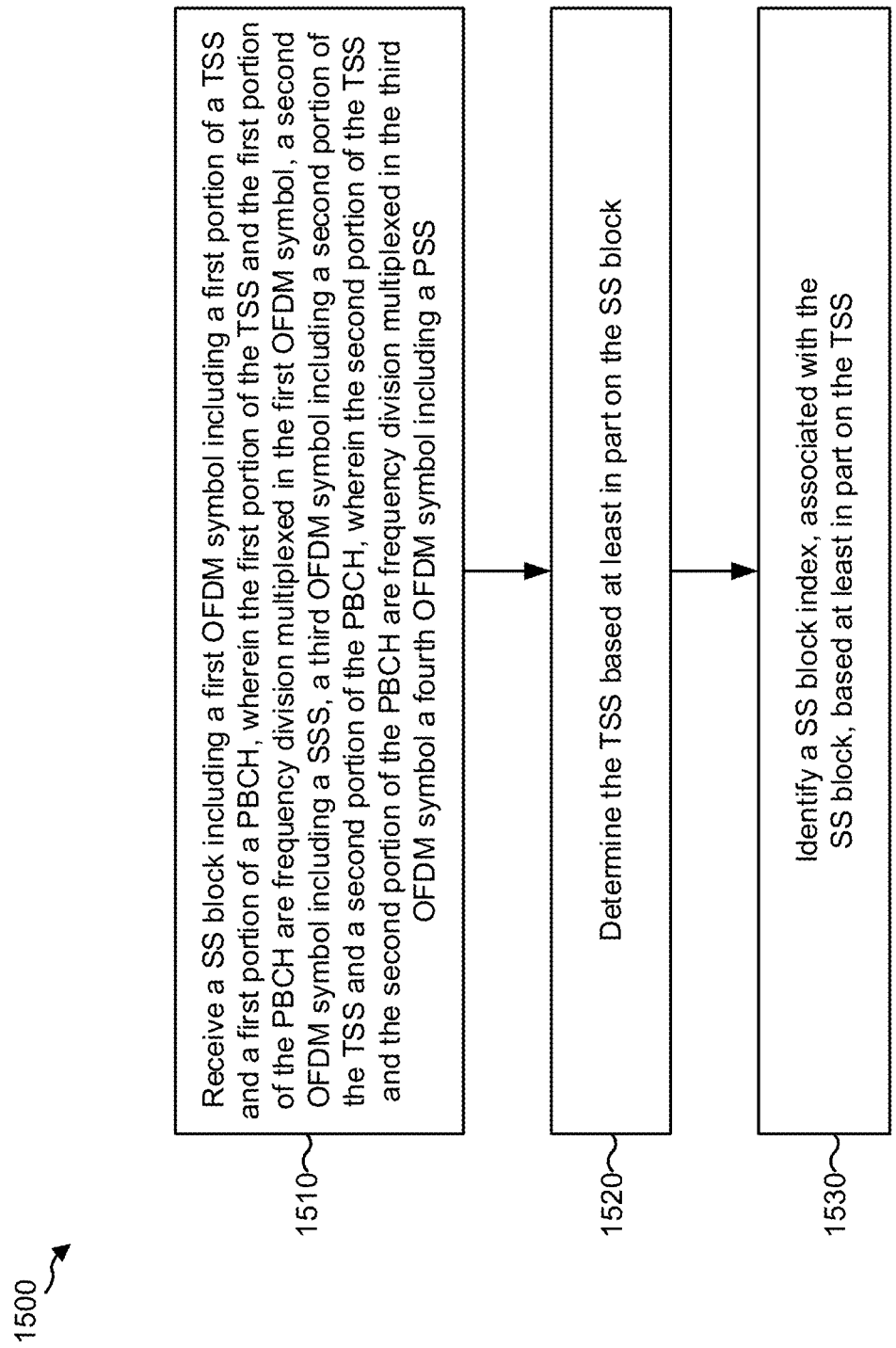
FIG. 15 is a diagram illustrating an example process performed, for example, by a user equipment, in accordance with various aspects of the present disclosure.

FIG. 15 is a diagram illustrating an example process 1500 performed, for example, by a UE, in accordance with various aspects of the present disclosure.

As shown in FIG. 15, in some aspects, process 1500 may include receiving a SS block including a first OFDM symbol including a first portion of a TSS and a first portion of a PBCH, wherein the first portion of the TSS and the first portion of the PBCH are frequency division multiplexed in the first OFDM symbol, a second OFDM symbol including a SSS, a third OFDM symbol including a second portion of the TSS and a second portion of the PBCH, wherein the second portion of the TSS and the second portion of the PBCH are frequency division multiplexed in the third OFDM symbol a fourth OFDM symbol including a PSS (block 1510). For example, UE 120 may receive the SS block, as described above.

As further shown in FIG. 15, in some aspects, process 1500 may include determining the TSS based at least in part on the SS block (block 1520). For example, UE 120 may determine the TSS based at least in part on the SS block, as described above.

As further shown in FIG. 15, in some aspects, process 1500 may include identifying a SS block index, associated with the SS block, based at least in part on the TSS (block 1530). For example, UE 120 may identify a SS block index, associated with the SS block, based at least in part on the TSS, as described above.

In some aspects, UE 120 may verify the SS block index based at least in part on one or more cyclic redundancy check bits appended to the set of bits.

In some aspects, UE 120 may descramble the TSS based at least in part on a physical cell identifier associated with a base station.

In some aspects, UE 120 may acquire a system based at least in part on the SS block index.

In some aspects, UE 120 may send a measurement report including the SS block index and a physical cell identifier associated with a base station.

In some aspects, UE 120 may demodulate the PBCH based at least in part on the TSS and the SSS.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
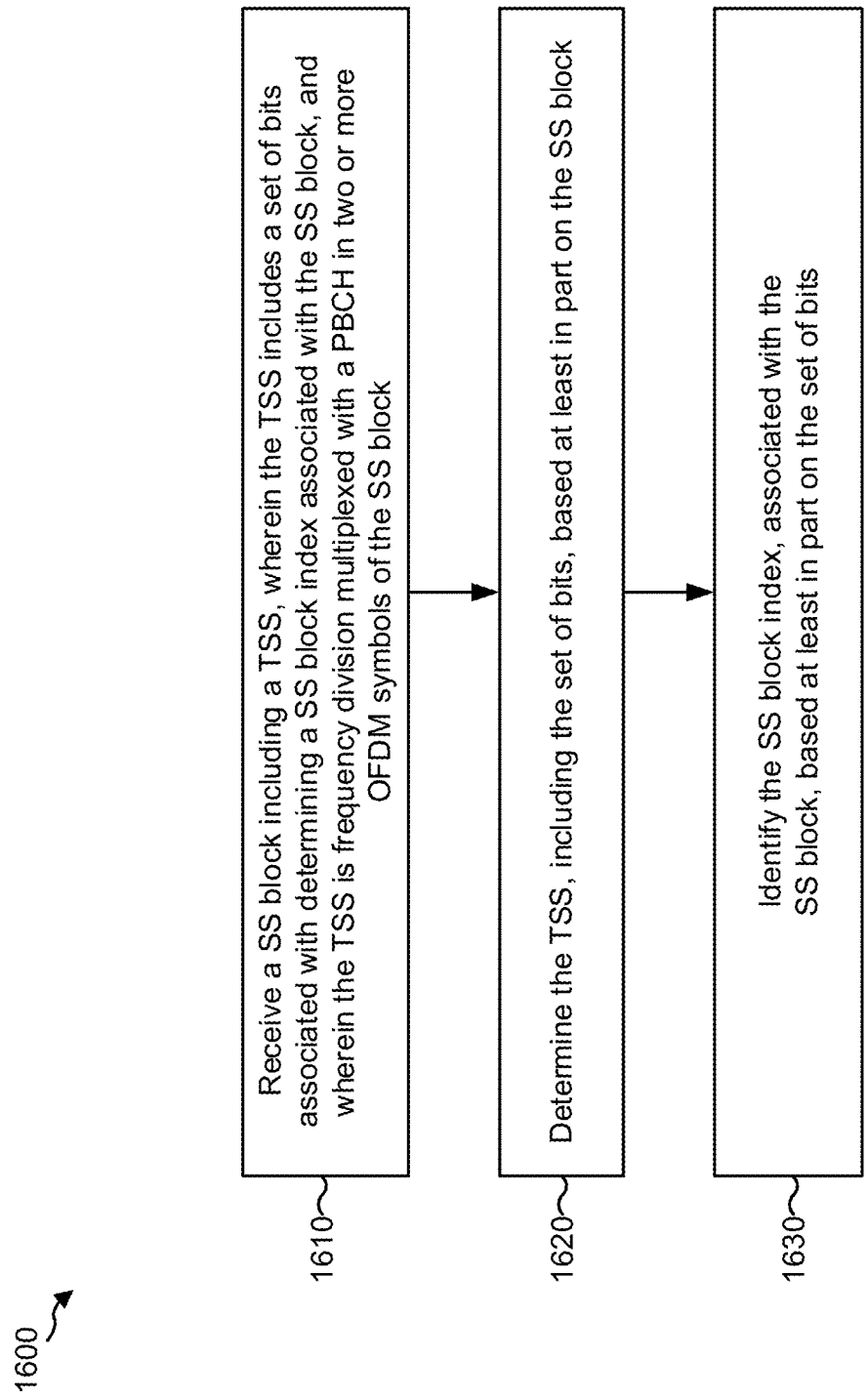
FIG. 16 is a diagram illustrating another example process performed, for example, by a user equipment, in accordance with various aspects of the present disclosure.

FIG. 16 is a diagram illustrating an example process 1600 performed, for example, by a UE, in accordance with various aspects of the present disclosure.

As shown in FIG. 16, in some aspects, process 1600 may include receiving a SS block including a TSS, wherein the TSS includes a set of bits associated with determining a SS block index associated with the SS block, and wherein the TSS is frequency division multiplexed with a PBCH in two or more OFDM symbols of the SS block (block 1610). For example, UE 120 may receive a SS block including a TSS, wherein the TSS includes a set of bits associated with determining a SS block index associated with the SS block, and wherein the TSS is frequency division multiplexed with a PBCH in two or more OFDM symbols of the SS block, as described above.

As further shown in FIG. 16, in some aspects, process 1600 may include determining the TSS, including the set of bits, based at least in part on the SS block (block 1620). For example, UE 120 may determine the TSS, including the set of bits, based at least in part on the SS block, as described above.

As further shown in FIG. 16, in some aspects, process 1600 may include identifying the SS block index, associated with the SS block, based at least in part on the set of bits (block 1630). For example, UE 120 may identify the SS block index, associated with the SS block, based at least in part on the set of bits, as described above.

In some aspects, the TSS may be a first TSS and the SS block may be a first SS block included in a first SS burst of a first SS burst set, and UE 120 may determine a second TSS included in a second SS block, wherein the second SS block is included in a second SS burst, wherein the second SS burst is included in the first SS burst set or a second SS burst set, and UE 120 may combine the first TSS with the second TSS.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
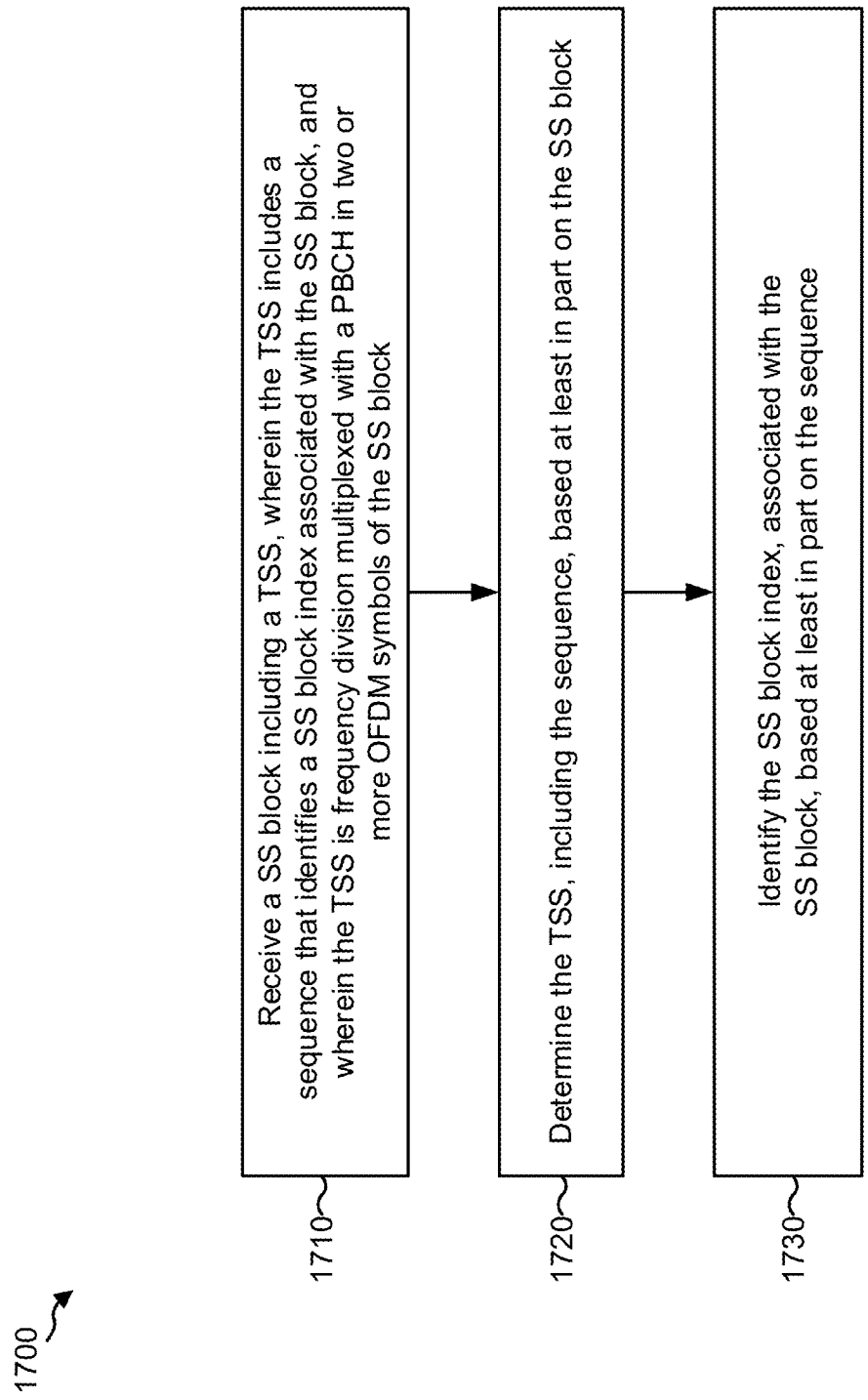
FIG. 17 is a diagram illustrating an additional example process performed, for example, by a user equipment, in accordance with various aspects of the present disclosure.

FIG. 17 is a diagram illustrating an example process 1700 performed, for example, by a UE, in accordance with various aspects of the present disclosure.

As shown in FIG. 17, in some aspects, process 1700 may include receiving a SS block including a TSS, wherein the TSS includes a sequence that identifies a SS block index associated with the SS block, and wherein the TSS is frequency division multiplexed with a PBCH in two or more OFDM symbols of the SS block (block 1710).

For example, UE 120 may receive a SS block including a TSS, wherein the TSS includes a sequence that identifies a SS block index associated with the SS block, and wherein the TSS is frequency division multiplexed with a PBCH in two or more OFDM symbols of the SS block, as described above.

As further shown in FIG. 17, in some aspects, process 1700 may include determining the TSS, including the sequence, based at least in part on the SS block (block 1720). For example, UE 120 may determine the TSS, including the sequence, based at least in part on the SS block, as described above.

As further shown in FIG. 17, in some aspects, process 1700 may include identifying the SS block index, associated with the SS block, based at least in part on the sequence (block 1730). For example, UE 120 may identify the SS block index, associated with the SS block, based at least in part on the sequence, as described above.

In some aspects, when identifying the SS block index associated with the SS block, UE 120 may determine a cyclic shift, associated with the sequence, based at least in part on a base sequence, and identify the SS block index based at least in part on the cyclic shift.

In some aspects, the TSS and the PBCH may use a same numerology, a same modulation and channel coding scheme, and a same transmit diversity scheme.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

FIG. 18 is a diagram illustrating an example process 1800 performed, for example, by a UE, in accordance with various aspects of the present disclosure.

As shown in FIG. 18, in some aspects, process 1800 may include receiving a SS block including a TSS and a PBCH, wherein the TSS includes information that identifies a SS block index associated with the SS block, and wherein the TSS is frequency division multiplexed with the PBCH in two or more OFDM symbols of the SS block, and wherein the PBCH is scrambled based at least in part the SS block index (block 1810). For example, UE 120 may receive a SS block including a TSS and a PBCH, wherein the TSS includes information that identifies a SS block index associated with the SS block, and wherein the TSS is frequency division multiplexed with the PBCH in two or more OFDM symbols of the SS block, and wherein the PBCH is scrambled based at least in part the SS block index, as described above.

As further shown in FIG. 18, in some aspects, process 1800 may include determining the SS block index based at least in part on the TSS (block 1820). For example, UE 120 may determine the SS block index based at least in part on the TSS, as described above.

As further shown in FIG. 18, in some aspects, process 1800 may include communicating with a base station based on the SS block index (block 1830). For example, UE 120 may communicate with base station 110 based on the SS block index, as described above.

In some aspects, the TSS and the PBCH are frequency division multiplexed in different OFDM symbols, wherein the SS block further includes: another OFDM symbol including a secondary synchronization signal (SSS), and another OFDM symbol including a primary synchronization signal (PSS).

In some aspects, the TSS is a PBCH demodulation reference signal (DMRS).

In some aspects, the PBCH is demodulated based at least in part on the TSS.

In some aspects, the TSS is used as a phase reference for the PBCH.

In some aspects, the UE may send a measurement report including the SS block index and a physical cell identifier associated with the base station.

In some aspects, the SS block is one of a plurality of SS blocks included in a SS burst, and the SS burst is one of a plurality of SS bursts included in a SS burst set.

In some aspects, the UE may acquire a system based at least in part on the SS block index.

In some aspects, UE 120 may verify the SS block index based at least in part on descrambling the PBCH based at least in part on the SS block index.

In some aspects, the PBCH may be further scrambled based at least in part on a physical cell identifier associated with the SS block, and UE 120 may determine, based at least in part on the SS block, the physical cell identifier, and descramble the PBCH further based at least in part on the physical cell identifier.

In some aspects, UE 120 may verify the physical cell identifier based at least in part on descrambling the PBCH based at least in part on the physical cell identifier.

In some aspects, the TSS is a PBCH demodulation reference signal (DMRS). In some aspects, the PBCH is demodulated based at least in part on the TSS. In some aspects, the TSS is used as a phase reference for modulating the PBCH.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method for wireless communication performed by a base station (BS), comprising:
   identifying a synchronization signal (SS) block index associated with a SS block; and
   transmitting the SS block including a tertiary synchronization signal (TSS) and a physical broadcast channel (PBCH),
   wherein the TSS comprises a sequence indicative of at least a portion of the SS block index associated with the SS block,
   wherein the TSS is frequency division multiplexed with the PBCH in two or more orthogonal frequency-division multiplexed (OFDM) symbols of the SS block, and
   wherein the PBCH is modulated based at least in part on the TSS.

2. The method of claim 1, wherein the at least a portion of the SS block index is conveyed by a cyclic shift of a base sequence of the TSS.

3. The method of claim 1,
   wherein the SS block comprises an OFDM symbol with a primary synchronization signal (PSS),
   wherein the SS block comprises another OFDM symbol with a secondary synchronization signal (SSS), and
   wherein the PSS and the SSS convey a cell identifier associated with the base station.

4. The method of claim 1, wherein the TSS provides a phase reference for the PBCH.

5. The method of claim 1, wherein the TSS is a PBCH demodulation reference signal (DMRS).

6. A wireless communication device, comprising:
   a memory; and
   one or more processors coupled to the memory, the memory and the one or more processors configured to:
      identify a synchronization signal (SS) block index associated with a SS block; and
      transmit the SS block including a tertiary synchronization signal (TSS) and a physical broadcast channel (PBCH),
         wherein the TSS comprises a sequence indicative of at least a portion of the SS block index associated with the SS block,
         wherein the TSS is frequency division multiplexed with the PBCH in two or more orthogonal frequency-division multiplexed (OFDM) symbols of the SS block, and wherein the PBCH is modulated based at least in part on the TSS, and
         wherein the PBCH is modulated based at least in part on the TSS.

7. The wireless communication device claim 6, wherein the at least a portion of the SS block index is conveyed by a cyclic shift of a base sequence of the TSS.

8. The wireless communication device of claim 6,
   wherein the SS block comprises an OFDM symbol with a primary synchronization signal (PSS), wherein the SS block comprises another OFDM symbol with a secondary synchronization signal (SSS), and wherein the PSS and the SSS convey a cell identifier.

9. The wireless communication device of claim 6, wherein the TSS provides a phase reference for the PBCH.

10. The wireless communication device of claim 6, wherein the TSS is a PBCH demodulation reference signal (DMRS).

11. A method for wireless communication performed by a user equipment (UE), comprising:
receiving a synchronization signal (SS) block including a tertiary synchronization signal (TSS) and a physical broadcast channel (PBCH),
wherein the TSS comprises a sequence indicative of at least a portion of an SS block index associated with the SS block, and
wherein the TSS is frequency division multiplexed with the PBCH in two or more orthogonal frequency-division multiplexed (OFDM) symbols of the SS block,
demodulating the PBCH based at least in part on the TSS;
determining the SS block index based at least in part on the sequence of the TSS; and
communicating with a base station using the SS block index.

12. The method of claim 11, wherein the at least a portion of the SS block index is conveyed by a cyclic shift of a base sequence of the TSS.

13. The method of claim 11,
wherein the SS block includes an OFDM symbol including a primary synchronization signal (PSS),
wherein the SS block includes another OFDM symbol including a secondary synchronization signal (SSS), and
wherein the method further comprises:
determining a cell identifier associated with the base station based at least in part on the PSS and the SSS.

14. The method of claim 13, further comprising:
sending a measurement report including the cell identifier associated with the base station.

15. The method of claim 11, wherein the TSS is used as a phase reference for demodulating the PBCH.

16. The method of claim 11, wherein the TSS is a PBCH demodulation reference signal (DMRS).

17. The method of claim 11, further comprising:
acquiring a system based at least in part on the SS block index.

18. A wireless communication device, comprising:
a memory; and
one or more processors coupled to the memory, the memory and the one or more processors configured to:
receive a synchronization signal (SS) block including a tertiary synchronization signal (TSS) and a physical broadcast channel (PBCH),
wherein the TSS comprises a sequence indicative of at least a portion of a SS block index associated with the SS block, and
wherein the TSS is frequency division multiplexed with the PBCH in two or more orthogonal frequency-division multiplexed (OFDM) symbols of the SS block,
demodulate the PBCH based at least in part on the TSS;
determine the SS block index based at least in part on the sequence of the TSS; and
communicate with a base station using the SS block index.

19. The wireless communication device of claim 18, wherein the at least a portion of the SS block index is conveyed by a cyclic shift of a base sequence of the TSS.

20. The wireless communication device of claim 18,
wherein the SS block includes an OFDM symbol including a primary synchronization signal (PSS),
wherein the SS block includes another OFDM symbol including a secondary synchronization signal (SSS), and
wherein the memory and the one or more processors are configured to determine a cell identifier associated with the base station based at least in part on the PSS and the SSS.

21. The wireless communication device of claim 20, wherein the one or more processors are further configured to:
send a measurement report including the SS block index and the cell identifier associated with the base station.

22. The wireless communication device of claim 18, wherein the TSS is used as a phase reference for the PBCH.

23. The wireless communication device of claim 18, wherein the TSS is a PBCH demodulation reference signal (DMRS).

24. The wireless communication device of claim 18, wherein the one or more processors are further configured to:
acquire a system based at least in part on the SS block index.

\* \* \* \* \*